US012694249B2

(12) United States Patent　　　　(10) Patent No.:　US 12,694,249 B2
Hano et al.　　　　　　　　　　　　(45) Date of Patent:　　　Jul. 28, 2026

(54) IMAGE FORMING APPARATUS FOR CREATING IMAGE FORMING CONDITION

(71) Applicant: CANON KABUSHIKI KAISHA, Tokyo (JP)

(72) Inventors: Masami Hano, Chiba (JP); Masahiko Mizoguchi, Kanagawa (JP); Keita Hidaka, Ibaraki (JP); Hiromi Shimura, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 18/607,676

(22) Filed: Mar. 18, 2024

(65) Prior Publication Data

US 2024/0320456 A1　　Sep. 26, 2024

(30) Foreign Application Priority Data

Mar. 22, 2023　　(JP) ................................ 2023-045790

(51) Int. Cl.
　　*G06K 15/02*　　　(2006.01)
　　*G06K 15/00*　　　(2006.01)
　　*G06K 15/14*　　　(2006.01)
(52) U.S. Cl.
　　CPC ........... *G06K 15/027* (2013.01); *G06K 15/14* (2013.01); *G06K 15/407* (2013.01)

(58) Field of Classification Search
　　None
　　See application file for complete search history.

(56) References Cited

U.S. PATENT DOCUMENTS

2011/0304887 A1* 12/2011 Nakase .............. G03G 15/5033
　　　　　　　　　　　　　　　　　　　　　　　358/3.24
2019/0086851 A1* 3/2019 Takemura .......... G03G 15/5041

FOREIGN PATENT DOCUMENTS

JP　　　2000238341 A　　9/2000
JP　　　2019056760 A　　4/2019
JP　　　2019070743 A　　5/2019

* cited by examiner

*Primary Examiner* — Dov Popovici
(74) *Attorney, Agent, or Firm* — Venable LLP

(57)　　　　ABSTRACT
An image forming apparatus forms an image on a sheet and includes an image forming unit to acquire image data and form an image, a sensor detects a pattern image formed by the image forming unit, and a controller controls the image forming unit to form a first pattern image of a first number of tone levels, executes a first calibration for generating a first image forming condition based on a detection of the detected first pattern image, controls the image forming unit to form a second pattern image of a second number of tone levels fewer than the first, acquires information having a correlation to a density of an image formed by the image forming unit, and executes a second calibration for generating a second image forming condition based on the detection result of the second pattern image, the acquired information, and the first image forming condition.

19 Claims, 15 Drawing Sheets

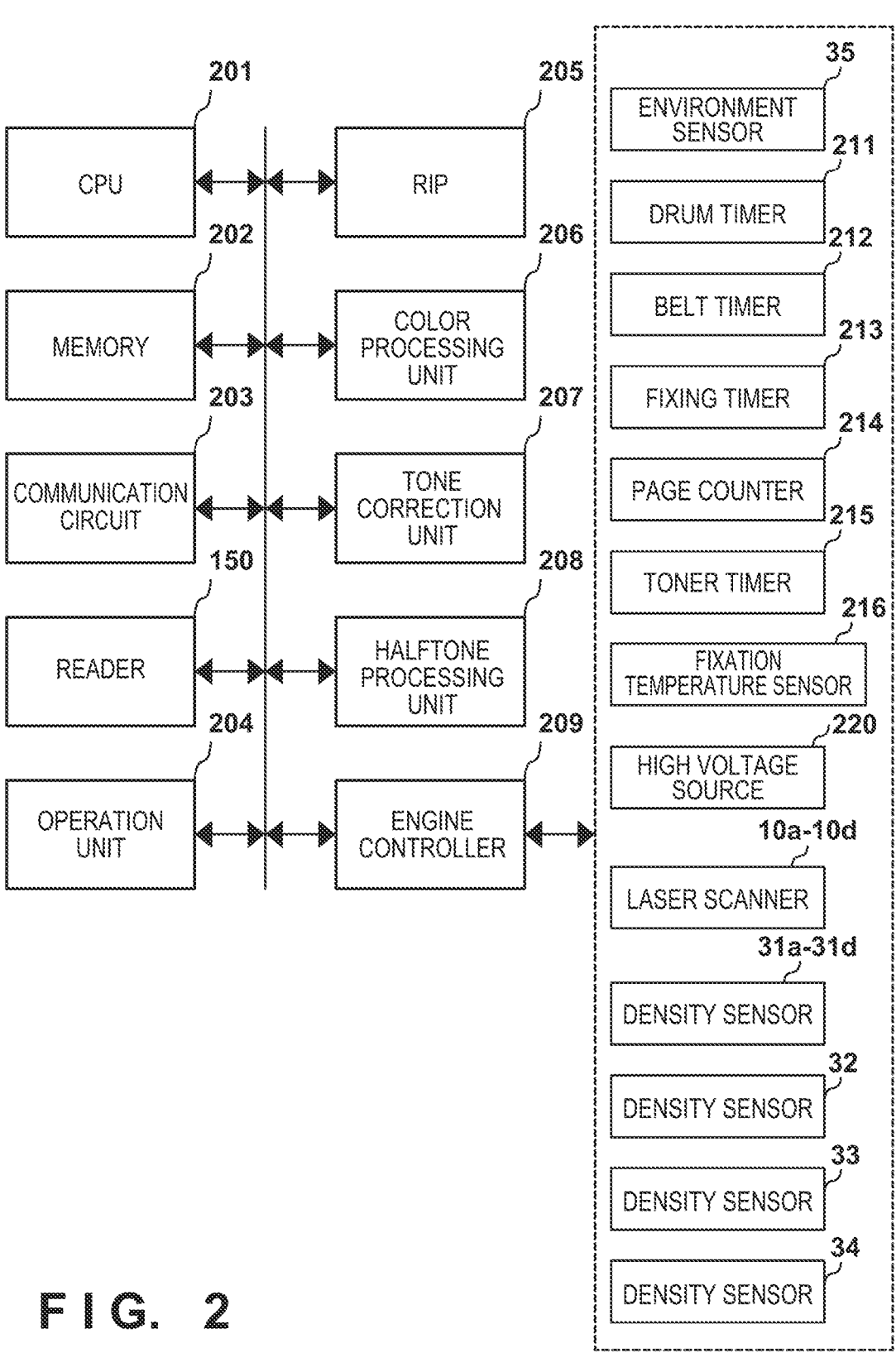
F I G.   2

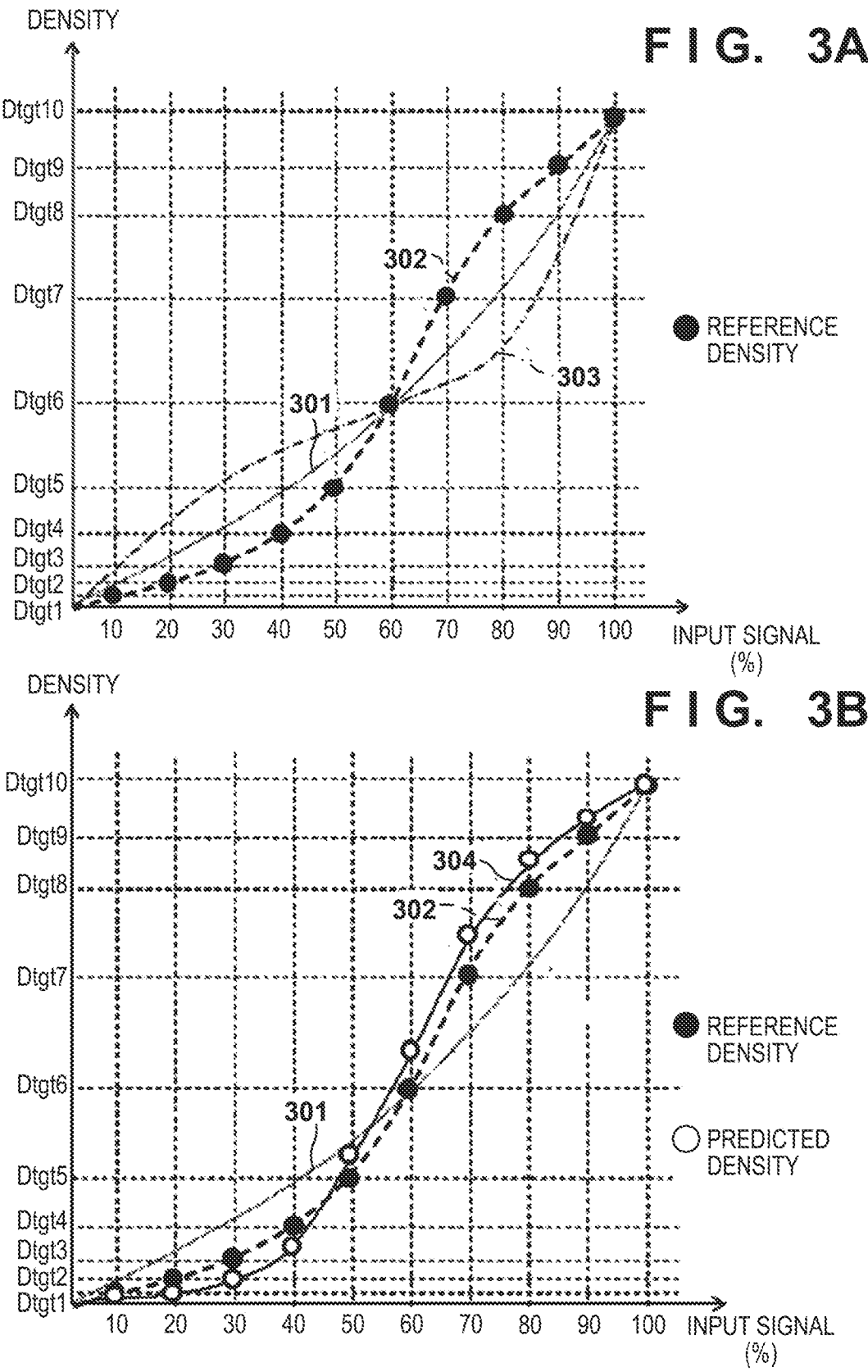
F I G. 3A
F I G. 3B

| DEFINITION NUMBER | 01 | 02 | 03 | 04 | 05 | 06 | 07 | 08 |
|---|---|---|---|---|---|---|---|---|
| TONER STATE | FIXED | FIXED | UNFIXED | UNFIXED | UNFIXED | UNFIXED | UNFIXED | UNFIXED |
| CARRIER | SHEET | SHEET | PHOTO-SENSITIVE DRUM | PHOTO-SENSITIVE DRUM | INTERMEDIATE TRANSFER BELT | INTERMEDIATE TRANSFER BELT | SHEET | SHEET |
| γLUT | ON | OFF | ON | OFF | ON | OFF | ON | OFF |
| DENSITY SENSOR | DENSITY SENSOR 34 | DENSITY SENSOR 34 | DENSITY SENSOR 31 | DENSITY SENSOR 31 | DENSITY SENSOR 32 | DENSITY SENSOR 32 | DENSITY SENSOR 33 | DENSITY SENSOR 33 |

F I G. 8A

| INPUT VALUE | ACQUIRED DATA |
|---|---|
| X1~X8 | ENVIRONMENT PARAMETERS (CAUSE DATA) |
| X9 | NUMBER OF TONE LEVELS n IN TEST PATTERN = 10; DEFINITION 03 |
| X10 | NUMBER OF TONE LEVELS m IN TEST PATTERN = 1; DEFINITION 04 |

F I G. 8B

| INPUT VALUE | ACQUIRED DATA |
|---|---|
| X1~X8 | ENVIRONMENT PARAMETERS (CAUSE DATA) |
| X9 | NUMBER OF TONE LEVELS n IN TEST PATTERN = 10; DEFINITION 05 |
| X10 | NUMBER OF TONE LEVELS m IN TEST PATTERN = 1; DEFINITION 06 |

F I G. 8C

| INPUT VALUE | ACQUIRED DATA |
|---|---|
| X1~X8 | ENVIRONMENT PARAMETERS (CAUSE DATA) |
| X9 | NUMBER OF TONE LEVELS n IN TEST PATTERN = 10; DEFINITION 01 |
| X10 | NUMBER OF TONE LEVELS m IN TEST PATTERN = 1; DEFINITION 02 |

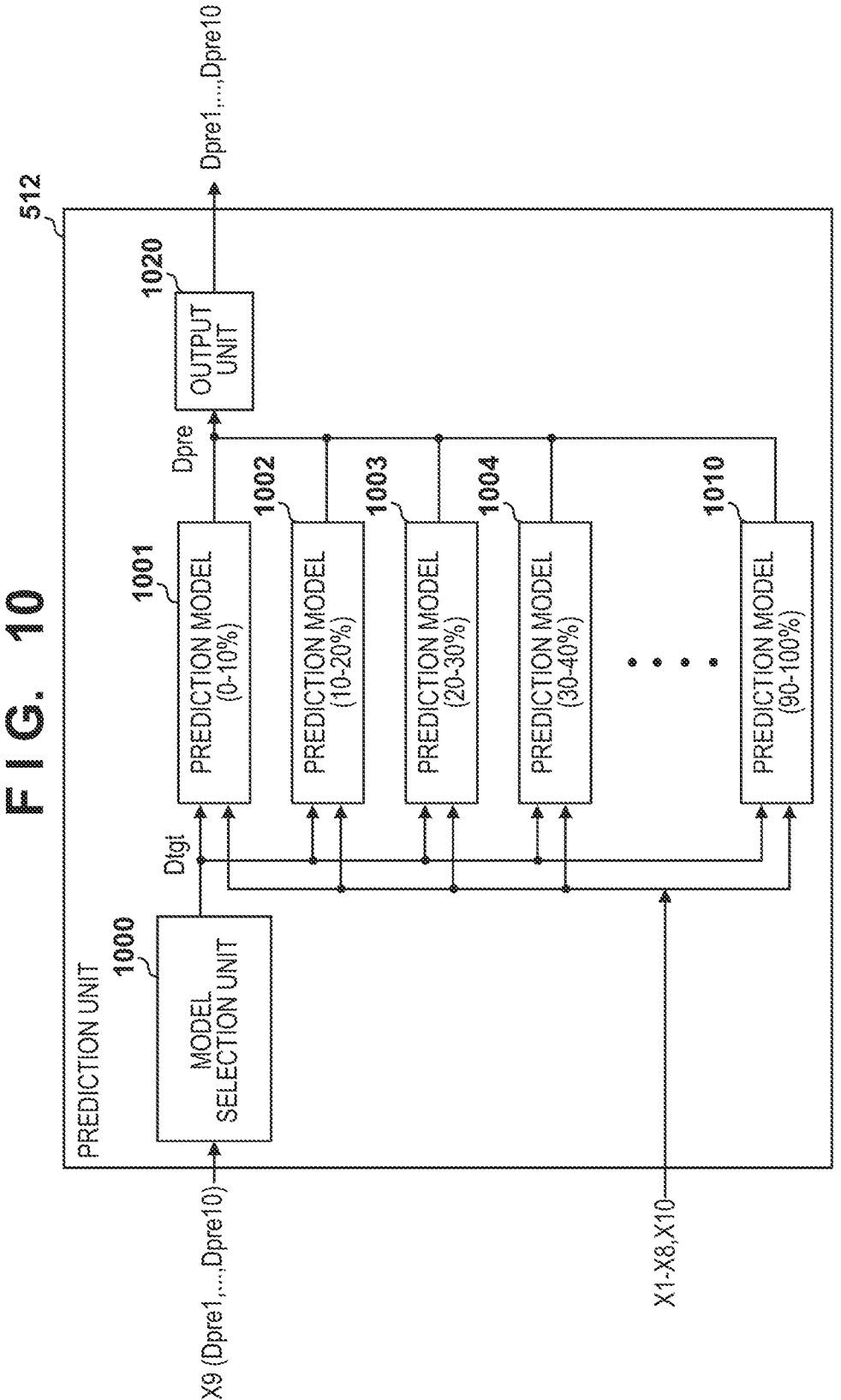
F I G. 10

F I G.  12
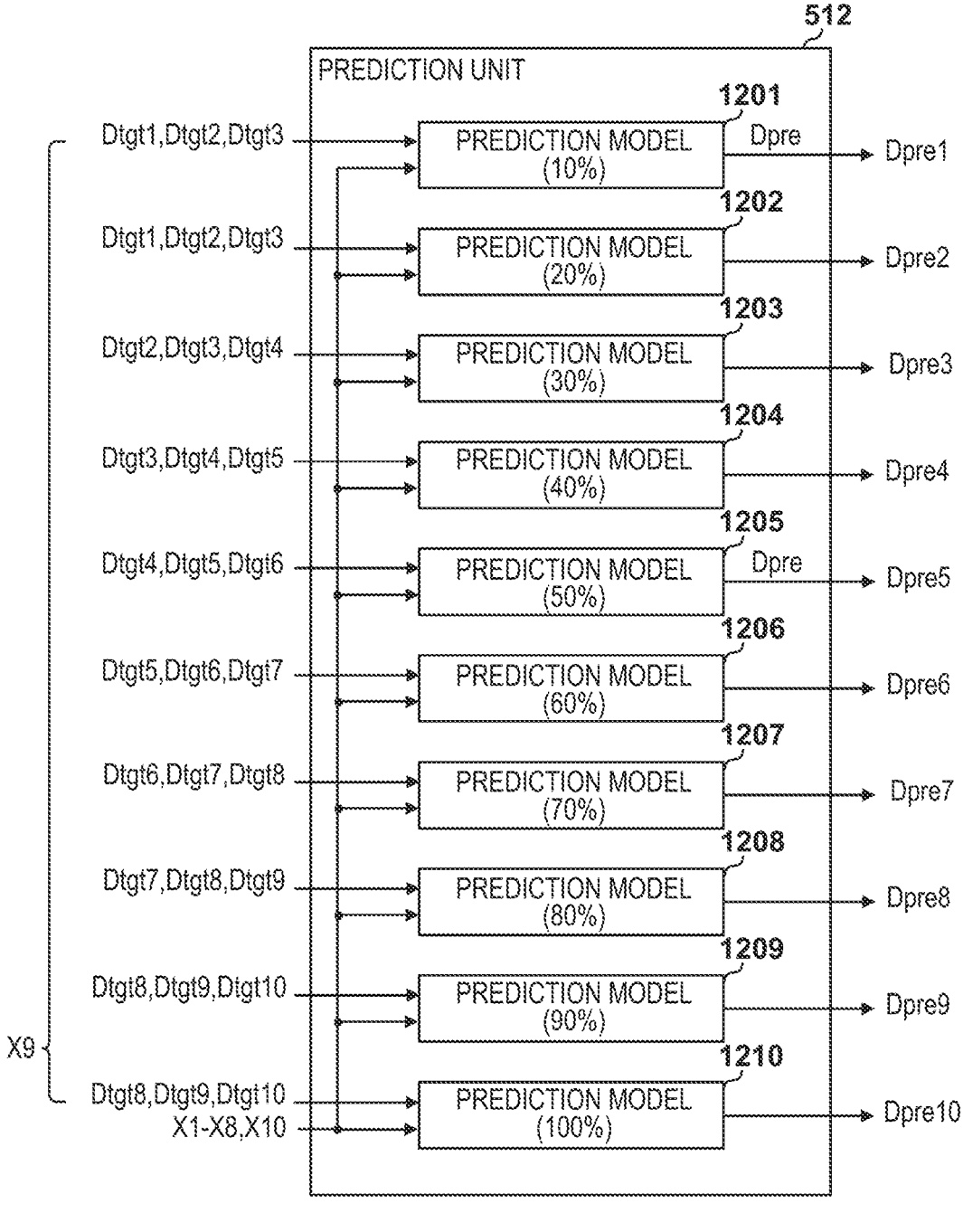

F I G. 13

1300

1301 MACHINE LEARNING SERVER

1302 DATA SERVER

1303 PC

100 IMAGE FORMING APPARATUS

F I G. 15A
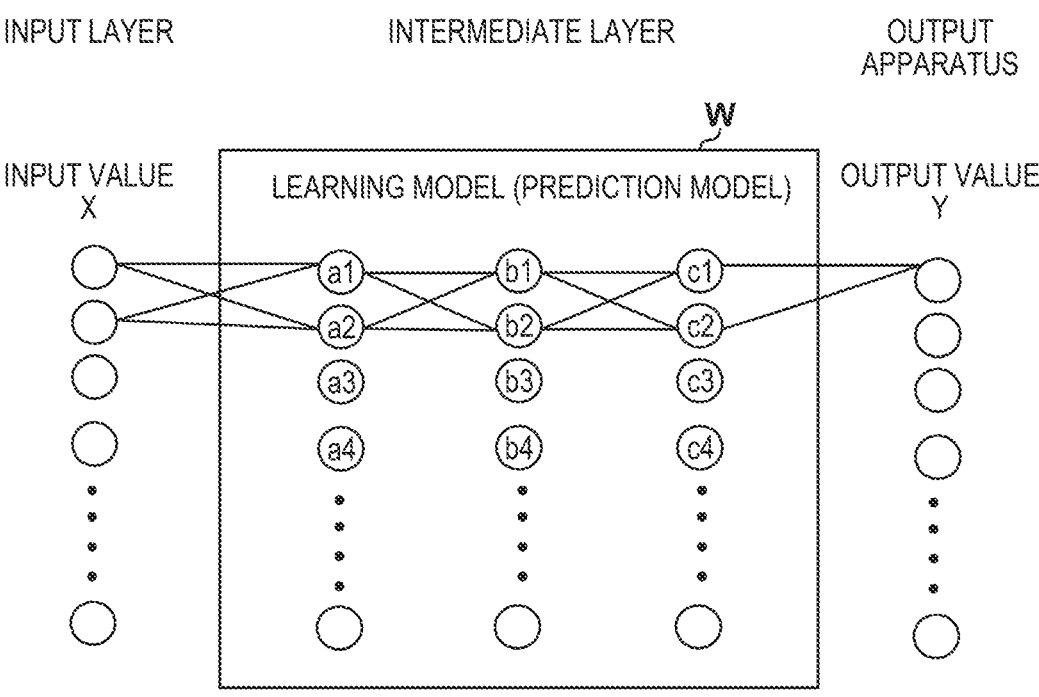
F I G. 15B
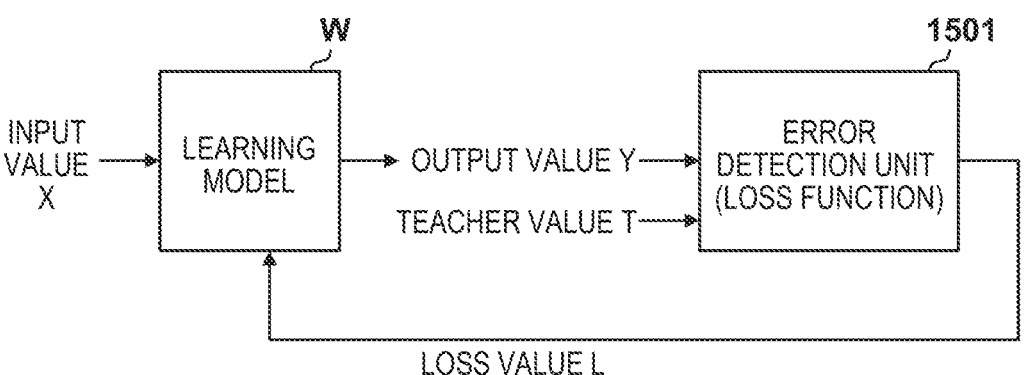

IMAGE FORMING APPARATUS FOR CREATING IMAGE FORMING CONDITION

CROSS REFERENCE TO PRIORITY APPLICATION

This application claims the benefit of Japanese Patent Application No. 2023-045790, filed Mar. 22, 2023, which is hereby incorporated by reference herein in its entirety.

BACKGROUND OF THE INVENTION

Field of the Invention

The present invention relates to an image forming apparatus that creates an image forming condition.

Description of the Related Art

The maximum density and tone characteristics of an image change in accordance with variation in the environment in which an image forming apparatus is installed or wear on a component mounted in the image forming apparatus. Therefore, the image forming apparatus executes calibration to keep a maximum density of an image at a target density or to keep a tone characteristic at a target characteristic. Japanese Patent Laid-Open No. 2000-238341 proposes a calibration in which a tone pattern is formed on a sheet and then read, and the read result is fed back into an image forming condition. In the invention of PTL1, since a tone pattern is formed on a sheet, the sheet and toner are consumed. In view of this, Japanese Patent Laid-Open No. 2019-056760 and Japanese Patent Laid-Open No. 2019-070743 propose predicting a density of an image immediately after the power is turned on or immediately after a return from a power saving mode, taking an environment condition based on the environment and an image forming condition set in the image forming apparatus as input values, and using the predicted density for calibration.

In an actual measurement calibration for correcting a tone characteristic based on an actual measurement value of a tone pattern, it is necessary to actually form a tone pattern on a sheet or a transfer body. Therefore, downtime, which is a time period in which the user cannot form an image, increases. Meanwhile, in prediction calibration for correcting a tone characteristic based on a predicted value without forming a tone pattern, the correction accuracy tends to be lower when compared with the actual measurement calibration. Prediction calibration is executed between actual measurement calibrations, and the current prediction value is obtained from the actual measurement values acquired in the past by actual measurement calibration. Therefore, in order to improve the accuracy of prediction calibration, it is necessary to increase the frequency of actual measurement calibration, which increases downtime.

SUMMARY OF THE INVENTION

The present disclosure provides an image forming apparatus that forms an image on a sheet, the image forming apparatus comprising an image forming unit configured to acquire image data and form an image based on the image data and an image forming condition, a sensor configured to detect a pattern image formed by the image forming unit, and a controller configured to: control the image forming unit to form a first pattern image of a first number of tone levels, execute a first calibration for generating a first image forming condition based on a detection result of the first pattern image detected by the sensor, to control the image forming unit to form a second pattern image of a second number of tone levels less than the first number of tone levels, to acquire information having a correlation to a density of an image to be formed by the image forming unit, and to execute a second calibration for generating a second image forming condition based on the detection result of the second pattern image detected by the sensor, the acquired information, and the first image forming condition.

Further features of the present invention will become apparent from the following description of exemplary embodiments (with reference to the attached drawings).

BRIEF DESCRIPTION OF THE DRAWINGS

FIG. 2 is a view for describing a controller.

FIGS. 3A and 3B are views illustrating a target characteristic, a measured density characteristic, a predicted density characteristic, and a γ look-up table (LUT)

FIG. 7 is a view for describing a definition of density data acquisition conditions.

FIGS. 8A to 8C are views for describing acquisition conditions applied in Examples 1 to 3.

FIG. 10 is a view for describing a prediction unit.

FIG. 12 is a view for describing the prediction unit.

FIG. 13 is a view for describing a learning system.

FIGS. 15A and 15B are views for describing a learning method.

DESCRIPTION OF THE EMBODIMENTS

Figure 1:
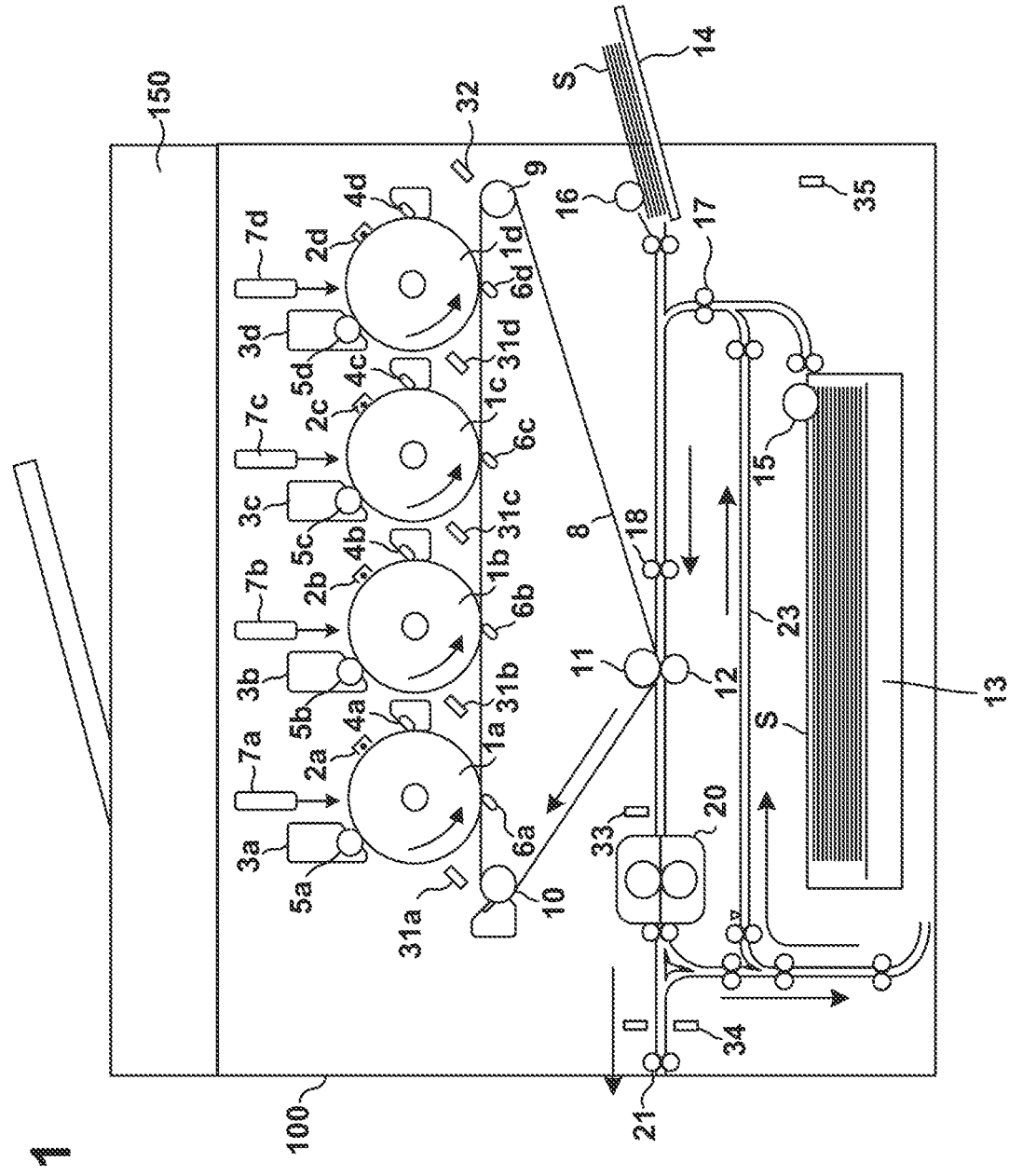
FIG. 1 is a view illustrating an image forming apparatus.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Image Forming Apparatus>

(1) Image Forming Engine

FIG. 1 is a cross-sectional view illustrating an image forming apparatus 100. The image forming apparatus 100 in this example is an electrophotographic full-color printer. In FIG. 1, "a", "b", "c", and "d" appended to the end of reference numerals indicate elements corresponding to yellow toner, magenta toner, cyan toner, and black toner, respectively. Therefore, when matters common to the four colors are described, the trailing "a", "b", "c", and "d" of the reference numeral may be omitted.

A photoconductor drum 1, a charger 2, a laser scanner 7, a developing device 3, a primary transfer unit 6, an intermediate transfer belt 8, an outer roller 12, and a fixing device 20 form an image forming unit.

The photoconductor drum 1 is an image carrier that carries an electrostatic latent image and a toner image and rotates. A drum cleaner 4 is a cleaning member that cleans the surface of the photoconductor drum 1. The charger 2 uniformly charges the surface of the photoconductor drum 1. The laser scanner 7 is an exposure device or a light source that exposes the surface of the photoconductor drum 1 to form an electrostatic latent image. The developing device 3 contains toner, and causes the toner to adhere to the photoconductor drum 1 via a developing roller 5 to form a toner image. The primary transfer unit 6 transfers the toner image from the photoconductor drum 1 to the intermediate transfer belt 8. The intermediate transfer belt 8 is a conveyance material (intermediate transfer member) that conveys a toner image, and is stretched around and rotated by a drive roller 9, a tension roller 10, and an inner roller 11.

A sheet cassette 13 is a container for storing a large number of sheets S. The sheets S may be referred to as a transfer material. A feed roller 15 feeds sheets S stored in the sheet cassette 13 to the conveyance path. A conveyance roller 17 conveys the sheet S further downstream. Sheets S stacked on a manual feed tray 14 are fed to the conveyance path by a feed roller 16. A registration roller 18 corrects a skew of the sheet S and further conveys the sheet S to a secondary transfer unit.

The secondary transfer unit is formed by the inner roller 11, the outer roller 12, and the intermediate transfer belt 8. When the sheet S passes through the secondary transfer unit, the toner image is transferred from the intermediate transfer belt 8 to the sheet S. The sheet S is conveyed to the fixing device 20.

The fixing device 20 includes a heating rotary member and a pressing rotary member, and fixes the unfixed toner image to the sheet S. At this time, the fixing device 20 applies pressure and heat to the unfixed toner image and the sheet S. A discharge roller 21 discharges the sheet S to the outside of the image forming apparatus 100.

In double-sided printing, a sheet S on which an image has been formed on a first surface is conveyed from the main conveyance path to a sub conveyance path 23, and is further conveyed to the upstream side of the main conveyance path. As a result, the sheet S is conveyed to the secondary transfer unit again, and an image is formed on a second surface of the sheet S.

(2) Sensor Group

A reader 150 is an image reading apparatus that reads an image of a document or reads a test chart. The test chart is a sheet S on which one or a plurality of test patterns (pattern images) are formed. The reader 150 includes a light source, a platen glass, an optical system, a CCD sensor, and the like. "CCD" is an abbreviation for a "charge-coupled device". The CCD sensor generates red, green, and blue color component signals. The reader 150 applies image processing (e.g., shading correction or the like) to the color component signals to generate image data.

A density sensor 31 detects a density of a toner image carried on the photoconductor drum 1. A density sensor 32 detects a density of the toner image carried on the intermediate transfer belt 8. A density sensor 33 detects a density of an unfixed toner image carried on the sheet S. A density sensor 34 detects a density of a toner image fixed on the sheet S. As described above, the density sensors 31 to 33 detect a density of unfixed toner image, and the density sensor 34 detects a density of a toner image fixed on the sheet S. The density sensors 31 to 34 may include, for example, a light-emitting element (e.g., a light-emitting diode) and a light-receiving element (a photodiode, an image sensor), and detect the density of the toner image therewith. The light receiving elements of the density sensors 31 to 34 each output a detection signal corresponding to an intensity of light reflected from the sheet S or the toner image. The intensity of the reflected light is converted into a density value by using a conversion table or the like. The detection results of the density sensors 31 to 34 are used for detecting an image defect, adjusting the maximum density of a toner image, correcting color misregistration, and correcting (calibrating) a tone characteristic, and the like.

An environment sensor 35 acquires environment parameters such as temperature and humidity. In the present embodiment, it is assumed that the environment parameters include a state (cumulative use time) of a component of the image forming apparatus 100, a cumulative number of images formed, and the like.

<Controller>

FIG. 2 illustrates a controller of the image forming apparatus 100. A CPU 201 is a central processing unit that controls the image forming apparatus 100 in accordance with a control program stored in a ROM area of a memory 202. "ROM" is an abbreviation for "read-only memory". The memory 202 is a storage apparatus including a random access memory (RAM), a ROM, a solid state drive (SSD), a hard disk drive (HDD), or the like. A communication circuit 203 is a circuit for communicating with a host computer, a server computer, and the like. The communication circuit 203 includes a transmission circuit and a reception circuit. An operation unit 204 includes a display apparatus and an input apparatus. For example, a user inputs a type (e.g., size, thickness, presence or absence of surface coating, material) of a sheet S and the like through the operation unit 204.

A raster image processor (RIP) 205 is a processor that expands image data into a bitmap image. A color processing unit 206 converts the color space of the bitmap image using a color management profile, or the like. For example, image data in RGB format is converted into image data in YMCK format. A tone correction unit 207 is an image processor that generates an output image signal by correcting image data (input image signal) based on a conversion condition (e.g., a tone correction table) so that a tone characteristic of an image formed by the image forming apparatus 100 becomes an ideal tone characteristic (target characteristic). The tone correction table is hereafter referred to as a γ LUT. A halftone processing unit 208 applies pseudo halftone processing such as a dither matrix or an error diffusion method to the tone corrected image data (output image signal). The image signal outputted from the halftone processing unit 208 is outputted to an engine controller 209.

The engine controller 209 controls components involved in the electrophotographic process in the image forming apparatus 100 (e.g., a high voltage source 220, the laser scanner 7, a motor, and a solenoid). The high voltage source 220 generates high voltages such as a charging bias, a developing bias, a primary transfer bias, and a secondary transfer bias. The engine controller 209 transfers an environment parameter detected by the environment sensor 35 to the CPU 201. In addition, the engine controller 209 transfers detection results of the density sensors 31 to 34 to the CPU 201.

The engine controller 209 acquires a use state of the image forming apparatus 100 using a timer, a counter, and the like. A drum timer 211 measures a cumulative rotation time of the photoconductor drum 1. The cumulative rotation time is counted only while the photoconductor drum 1 is rotating. That is, the cumulative rotation time indicates a cumulative degree of wear on the photoconductor drum 1. A belt timer 212 counts the cumulative rotation time of the intermediate transfer belt 8. The cumulative rotation time is counted only while the intermediate transfer belt 8 is rotating. That is, the cumulative rotation time indicates the cumulative degree of wear on the intermediate transfer belt 8.

A fixing timer 213 counts the cumulative operation time of the fixing device 20. The cumulative operation time indicates the degree of wear of the fixing device 20. A page counter 214 counts the number of sheets S on which an image has been formed in the image forming apparatus 100. This count value indicates the degree of wear of the image forming apparatus 100. A toner timer 215 is reset when toner is supplied to the developing device 3, and the toner timer 215 indicates a time (use time) during which toner remains in the developing device 3. Toner deteriorates over time. Therefore, the count value indicates a degree of wear (deterioration degree) of the toner. A fixing temperature sensor 216 measures a temperature of the fixing device 20. The higher the temperature, the faster the wear on the fixing device 20.

<Calibration (Tone Characteristic Correction Process)>

(1) Basic Concept

In the present embodiment, the tone characteristic is corrected using actual measurement calibration and prediction calibration. In the actual measurement calibration, a γ LUT is created based on an actual measurement value of density acquired from a test pattern. In the prediction calibration, the γ LUT is created using second density data in addition to an environment parameter of that point in time and first density data acquired by actual measurement calibration executed in the past.

The second density data may be different density data from the first density data acquired for the actual measurement calibration. An example of the second density data is as follows:

(a) Density data acquired at a timing different from the timing at which the first density data is acquired;

(b) Density data acquired from a test pattern (second pattern image) different from the test pattern (first pattern image) for the first density data;

(b1) The number of screen lines of a test pattern for the first density data is different from the number of screen lines of a test pattern for the second density data;

(b2) The first density data is acquired from a test pattern of n different tone values (density), and the second density data is acquired from a test pattern of m different tone values (density). However, m is a natural number smaller than n. For example, n=10 and m=1; and (b3) Although the γ LUT is applied for the test pattern for the first density data, a γ LUT is not applied for the test pattern for the second density data; and (c) Density data acquired from a test pattern formed for a purpose different from that of tone characteristic correction processing, such as the purpose of maximum density adjustment or measuring a charge amount (triboelectricity) of the toner in the developing device 3.

Since the information amount of the input value increases by using the second density data in addition to the first density data as an input value for obtaining the predicted density data (hereafter, referred to as predicted density), the accuracy of the predicted density will be improved. In Example (a), since a plurality of pieces of density data acquired at different timings are used, the influence of noise generated at a specific timing will be mitigated. In Example (b), the number of test patterns to whose density is to be measured increases. However, the m test patterns may be a portion of the n test patterns. In this case, the acquisition timing of the second density data may be different from the acquisition timing of the first density data. Alternatively, the number of screen lines for the first density data may be different from the number of screen lines for the second density data. In Example (c), since the second density data is acquired from a test pattern formed for another purpose, the test pattern is not formed in order to acquire the second density data for the tone characteristic correction process. In other words, an increase in downtime is suppressed. Each of Examples (a), (b), (c) may be used independently. Two of Examples (a), (b) and (c) may be used in combination. Alternatively, all of Examples (a), (b), and (c) may be combined.

As an example, in the following, ten input values, X1 to X10, are used to determine the predicted density.

X1: An environment parameter (e.g., temperature, humidity) acquired by the environment sensor 35;

X2: A cumulative rotation time of the photoconductor drum 1;

X3: A cumulative rotation time of the intermediate transfer belt 8;

X4: A cumulative usage time of the fixing device 20;

X5: A type of sheet S;

X6: A count value of a page counter (e.g., a cumulative number of images formed, a number of consecutive images formed per job, an amount of toner consumed);

X7: A toner usage time;

X8: A temperature of the fixing device 20;

X9: First density data (e.g., density data acquired from immediately preceding actual measurement calibration); and X10: Second density data.

Note that X9 is used in actual measurement calibration, but X1 to X8 and X10 are not used. In prediction calibration, X1 to X10 are used.

(2) Method for Creating a γ LUT

FIG. 3A is a view for describing a method for creating a γ LUT in an actual measurement calibration. The horizontal axis represents the density (tone) of the input signal. The vertical axis represents the measured density. Dtgt1 to Dtgt10 denote target densities for the input signal (10% to 100%).

Reference numeral 301 denotes a target tone characteristic (target characteristic). A reference density characteristic 302 is a tone characteristic obtained by interpolating and smoothing a reference density (first density data) acquired by measuring a test pattern. Reference numeral 303 denotes a γ LUT.

Depending on the environment in which the image forming apparatus 100 is installed, the degree of wear of the image forming apparatus 100, and the like, the tone characteristic of the toner image formed on the sheet S gradually deviates from a target characteristic 301. Therefore, the reference density characteristic 302 indicates the tone characteristic of the image forming apparatus 100 at that point in time. In order to bring the tone characteristic of the image forming apparatus 100 closer to the target characteristic 301, the image signal may be corrected by the γ LUT 303 in advance. That is, the γ LUT 303 has an inverse characteristic to the reference density characteristic 302 in relation to the target characteristic 301.

FIG. 3B is a view for describing a relationship between a reference density (first density data) and a predicted density.

The longer the elapsed time from when the reference density characteristic 302 is measured, the further the tone characteristic of the image forming apparatus 100 deviates from the target characteristic 301. Therefore, the predicted value of the current density (predicted density characteristic 304) is calculated from the reference density characteristic 302, an environment parameter, and the like. It is not necessary to create n test patterns in order to acquire the predicted density characteristic 304. In other words, an increase in downtime is suppressed.

Figure 4:
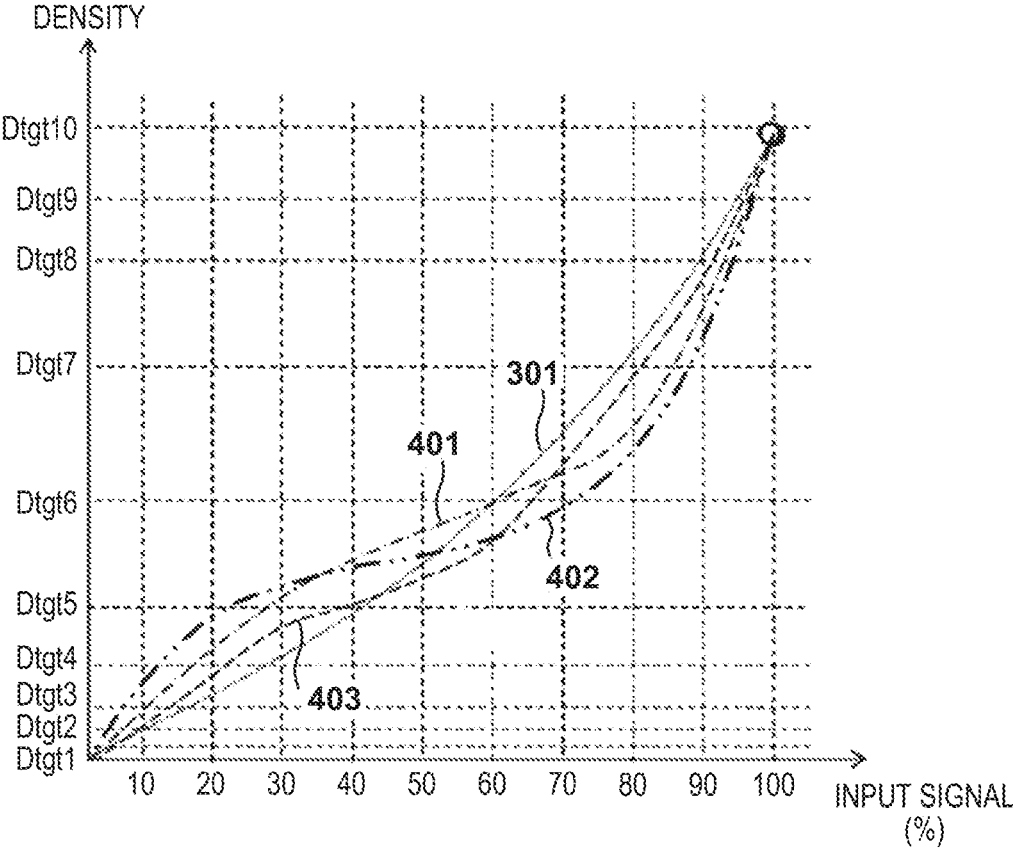
FIG. 4 is a view illustrating a target characteristic, a base table, a correction table, and a γ LUT.

FIG. 4 is a view for describing a prediction calibration. Reference numeral 401 denotes a γ LUT (base table) created based on a base density. When the tone characteristic of the image forming apparatus 100 matches the base density, the tone characteristic of the image forming apparatus 100 approaches the target characteristic 301 by using a base table 401. Reference numeral 402 denotes a correction table created from the predicted density at a certain point in time. The predicted density is calculated from the base density. Therefore, a correction table 402 is created based on the difference between the predicted density and the base density. By multiplying the base table 401 by the correction table 402, a γ LUT 403 corresponding to the predicted density is created. Therefore, the higher the accuracy of the predicted density is, the higher the accuracy of creation of the γ LUT 403 is.

(3) CPU Functions

Figure 5:
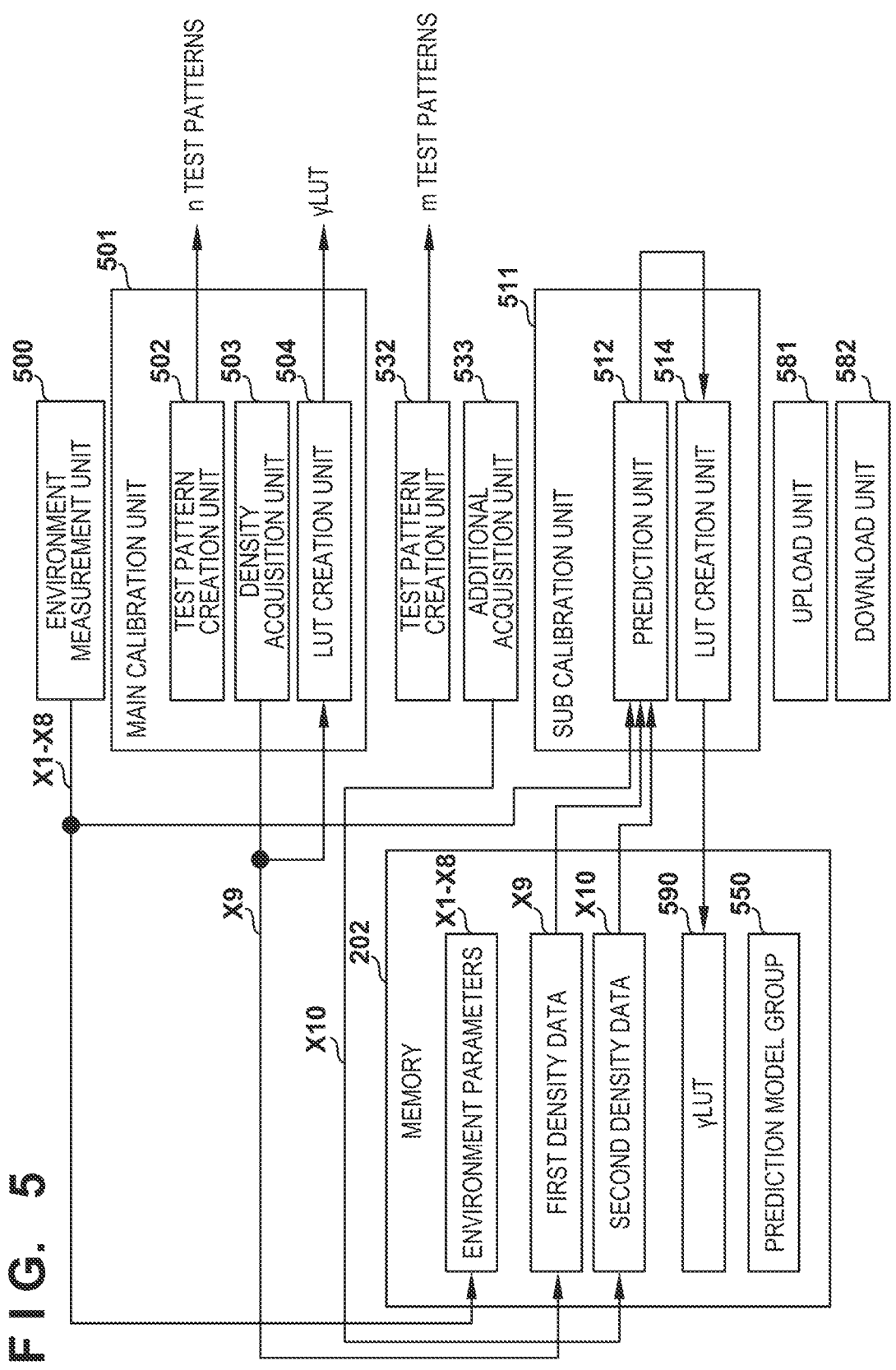
FIG. 5 is a view illustrating functions realized by a CPU.

FIG. 5 illustrates the functions realized by the CPU 201 according to the control program. The following plurality of functions may be realized by a plurality of CPUs. Some or all of the plurality of functions may be realized by an application specific integrated circuit (ASIC), a field-programmable gate array (FPGA), a graphical processing unit (GPU), or the like.

An environment measurement unit 500 acquires the environment parameters X1 to X8 using the environment sensor 35, the drum timer 211, the belt timer 212, the fixing timer 213, the page counter 214, the toner timer 215, and the fixing temperature sensor 216. The environment parameters X1 to X8 are primarily stored in the memory 202.

A main calibration unit 501 executes an actual measurement calibration. A test pattern creation unit 502 controls the image forming apparatus 100 to form n test patterns. The n test patterns are, for example, 10 test patterns corresponding to Dtgt1 to Dtgt10. A density acquisition unit 503 controls any one of the density sensors 31 to 34 to acquire the first density data X9 which includes n pieces of density data. The first density data X9 is continuously stored in the memory 202 even after being used for the actual measurement calibration. A LUT creation unit 504 creates a γ LUT 590 (the base table 401) based on the first density data X9 which is an actual measurement value. The γ LUT 590 is set in the tone correction unit 207.

For example, a test pattern creation unit 532 causes the image forming apparatus 100 to form m test patterns for acquiring density data used for adjusting the maximum image density and measuring the charge state of the toner. An additional acquisition unit 533 controls any one of the density sensors 31 to 34 to acquire second density data X10 which is made up of m pieces of density data.

A sub calibration unit 511 executes a prediction calibration. A prediction unit 512 provides the environment parameters X1 to X8, the first density data X9, and the second density data X10 as input values to a prediction model group 550, and obtains the predicted density characteristic 304. A LUT creation unit 514 creates the γ LUT 403 using the predicted density, and stores the γ LUT 403 as the γ LUT 590 in the memory 202. The LUT creation unit 514 may create the correction table 402 from the second density data X10, and create the γ LUT 403 (the γ LUT 590) by combining the base table 401 and the correction table 402.

An upload unit 581 uploads the environment parameters X1 to X8, the first density data X9, and the second density data X10 to the machine learning server that creates the prediction model group 550. These data may be supplied to the machine learning server via the data server. A download unit 582 downloads the prediction model group 550 from the machine learning server. The prediction model group 550 is stored in the memory 202 and used by the prediction unit 512. A method of creating the prediction model group 550 will be described later.

(4) Flowchart

Figure 6:
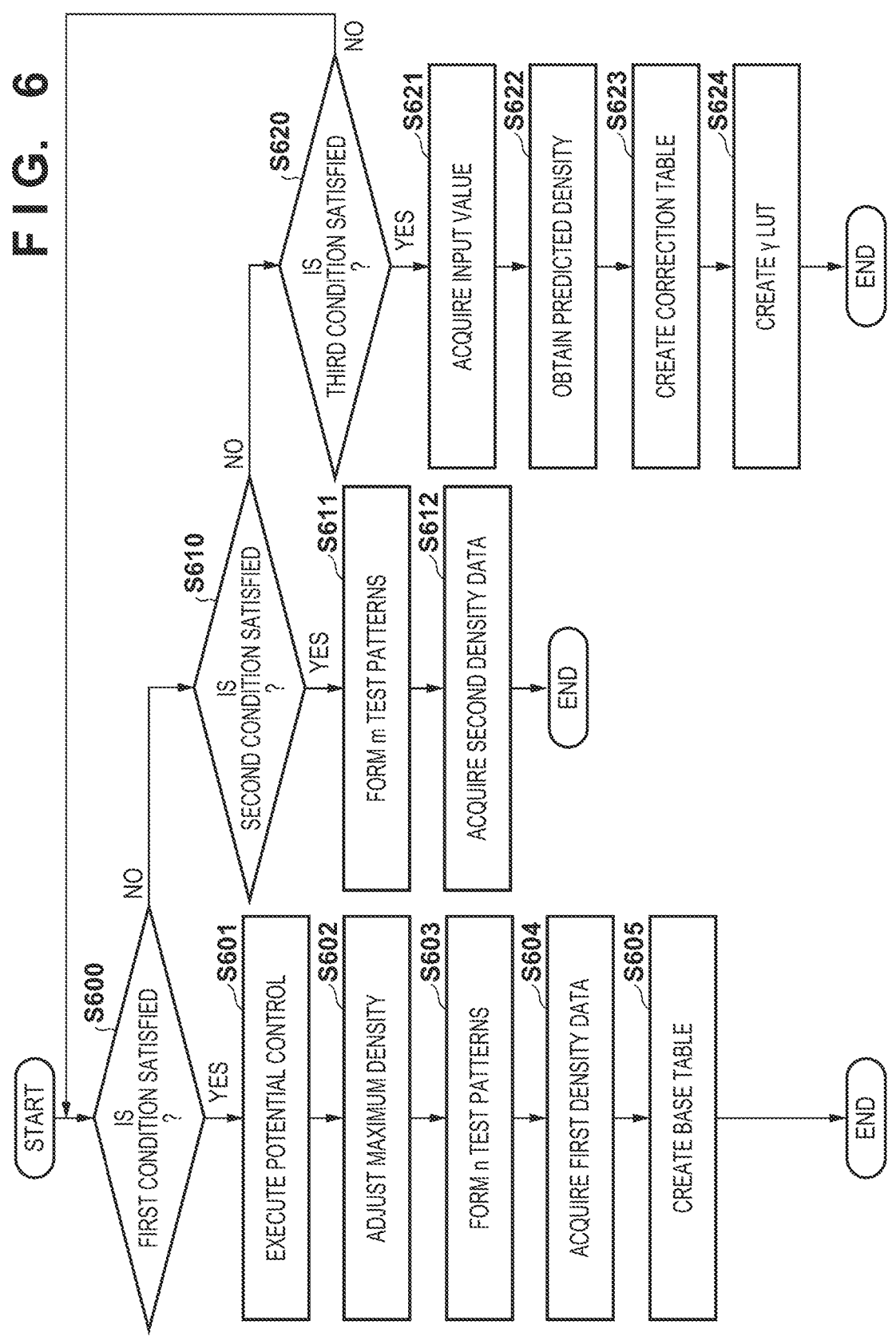
FIG. 6 is a flowchart illustrating a method for creating a γ LUT.

FIG. 6 is a flowchart illustrating density correction control (calibration). The CPU 201 executes the following processing according to the control program.

(4-1) Actual Measurement Calibration

Step S600: The CPU 201 determines whether a first condition is satisfied. The first condition is a condition for starting actual measurement calibration. The first condition is, for example, that the number of images formed reaches a predetermined threshold value (first threshold value), or the like. The number of images formed may be reset every time an actual measurement calibration is executed. When the first condition is satisfied, the CPU 201 advances the process from step S600 to step S601. If the first condition is not satisfied, the CPU 201 advances the process from step S600 to step S610.

Step S601: The CPU 201 executes potential control using the engine controller 209. For example, the engine controller 209 determines the charging bias and the developing bias according to environment conditions (e.g., temperature, humidity, and absolute moisture content) acquired by the environment sensor 35. Since potential control is known in the art, a detailed description thereof is omitted. The environment condition may be any parameter that correlates with the density of the image.

Step S602: The CPU 201 adjusts the maximum density of the toner image formed by the image forming apparatus 100. The maximum density is adjusted by changing the image forming conditions (e.g., laser power, etc.). The maximum density may be referred to as the maximum amount of applied toner. For example, the CPU 201 controls the image forming apparatus 100 through the engine controller 209 to form a test pattern on the sheet S. Then, the user causes the reader 150 to read the outputted sheet S. The CPU 201 acquires the read data outputted from the reader 150. The test pattern may be read by the density sensor 34. The CPU 201 is configured to determine the relationship between the amount of applied toner and the laser power, or the like, based on the read data. Further, the CPU 201 determines, for example, the laser power at which the maximum amount of applied toner is obtained from this relationship.

Step S603: The CPU 201 controls the image forming apparatus 100 through the engine controller 209 to form n test patterns for tone correction. The n test patterns may include, for example, a toner pattern of 10 tones for each toner color. Note that n is not limited to 10, and may be determined in consideration of a trade-off between downtime and correction accuracy.

Step S604: The CPU 201 acquires the first density data X9 from the n test patterns. For example, the user places a sheet S (test chart) on which n test patterns are formed on the reader 150 and causes the reader 150 to read the sheet S. The CPU 201 acquires the read data outputted from the reader 150. The CPU 201 obtains the image density (first density data X9) for each tone based on the read data. The first density data X9 is stored in the memory 202.

Step S605: The CPU 201 creates the base table 401 (the γ LUT 590) using the first density data X9 as a reference density. Note that the first density data X9 only includes n pieces of density data, and the density data is insufficient for creating the base table 401. Therefore, the CPU 201 may determine a base density characteristic by interpolating and smoothing between two adjacent pieces of density data.

(4-2) Acquisition of Additional Densities

Here, the method for acquiring the second density data X10, which is an additional density, will be described. The second density data X10 is used for prediction calibration.

Step S610: The CPU 201 determines whether a second condition is satisfied. The second condition is a condition for acquiring the second density data X. The second condition is, for example, that an environmental variation causing a large density variation has occurred, that an image rendering condition has changed greatly, that a preset timing has been reached, or the like. The image rendering condition means, for example, that a page to be printed changes to a page having a large number of solid images from a page having a small number of solid images, or the like. The second condition may be that the number of images formed is equal to or larger than the second threshold value. The second threshold is greater than the first threshold for the first condition. If the second condition is not satisfied, the CPU 201 advances the process from step S620 to step S610. Meanwhile, when the second condition is satisfied, the CPU 201 advances the process from step S610 to step S611.

Step S611: A table creation unit 733 of the CPU 201 controls the image forming apparatus 100 through the engine controller 209 to form m test patterns. The m test patterns may be test patterns for tone correction, or may be test patterns for other purposes. The m test patterns may include, for example, a test pattern of 1 tone for each toner color. Note that there is no limitation to a test pattern of a single tone and a test pattern of two or more tones may be formed.

Step S612: The CPU 201 uses any one of the density sensors 31 to 34 to acquire second density data X10 from the m test patterns. The second density data X10 is stored in the memory 202.

(4-3) Prediction Calibration

The environment parameters X1 to X8 may change as time elapses from when the base table 401 is created. Thus, the base table 401 must be modified in response to these changes. In order to create the base table 401, a test pattern must be formed. Therefore, downtime occurs. Accordingly, by applying the prediction calibration instead of the actual measurement calibration, the tone characteristic is maintained at the target characteristic 301 while suppressing an increase in downtime.

Step S620: The CPU 201 determines whether a third condition is satisfied. The third condition is a prediction calibration execution condition. The third condition is, for example, that the power of the image forming apparatus 100 is turned on, that the image forming apparatus 100 returns from a sleep mode, that there is a large variation in the environment, that a time set in advance is reached, or the like. If the third condition is not satisfied, the CPU 201 returns the process from step S620 to step S600. Meanwhile, when the second condition is satisfied, the CPU 201 advances the process from step S620 to step S621.

Step S621: The CPU 201 acquires an input value (environment parameters X1 to X8, first density data X9, and second density data X10). For example, the input value may be acquired from the memory 202. The first density data X9 and the second density data X10 are infrequently updated in order to suppress an increased downtime.

Step S622: The CPU 201 obtains a predicted density based on the input value (the environment parameters X1 to X8, the first density data X9, and the second density data X10). For example, ten predicted densities Dpre1 to Dpre10 corresponding to ten tones are obtained. Here, the 10 tones correspond to 10%, 20%, . . . , 100% of the input signal. That is, Dpre1 is the predicted density corresponding to 10%. That is, Dpre10 is the predicted density corresponding to 100%.

Step S623: The CPU 201 creates the correction table 402 based on the ten predicted density Dpre1 to Dpre10. The CPU 201 may interpolate and smooth the ten predicted densities Dpre1 to Dpre10 to create predicted density characteristics (predicted tone characteristics) and create the correction table 402 based on the predicted density characteristics.

Step S624: The CPU 201 creates the γ LUT 403 by combining the base table 401 and the correction table 402. The γ LUT 403 is stored in the memory 202 as the γ LUT 590.

(5) Definition of Test Pattern Detection Methods

FIG. 7 illustrates definition information 700 held in the memory 202. The definition information 700 indicates the toner state of the test pattern to be used to acquire the first density data X9 and the second density data X10; the carrier; whether the γ LUT 590 is on/off; and the density sensor to be used. Here, the toner state indicates whether the test pattern has been fixed to a carrier such as the sheet S or is unfixed. The carrier is any one of the sheet S, the photoconductor drum 1, and the intermediate transfer belt 8. As illustrated in FIG. 7, the definition information 700 includes, for example, eight definitions 01 to 08. The definitions applied to the first density data X9 and the second density data X10 may be the same or different. In a case when the definitions are applied to the first density data X9 and the second density data X10, the aforementioned first condition and second condition may be different from each other. Further, the definitions applied to the respective test patterns of Y, M, C, and K may be the same or different.

(5-1) Example 1

FIG. 8A is a view illustrating input values for the prediction model in Example 1. Here, X1 to X8 are environment parameters (cause data) which are causes of density variation. The first density data X9 is generated from Definition 03 and a 10 tone test pattern. As illustrated in FIG. 7, Definition 03 defines that an unfixed test pattern, which is formed with the γ LUT turned on and is carried on the photoconductor drum 1, is detected by the density sensor 31. The second density data X10 is generated from Definition 04 and a 1 tone test pattern. As illustrated in FIG. 7, Definition 04 defines that an unfixed test pattern, which is formed with the γ LUT turned on and is carried on the photoconductor drum 1, is detected by the density sensor 31. As described above, in Example 1, the first density data X9 and the second density data X10 differ from each other in the number of test patterns (the number of tone levels) and whether the γ LUT is on/off. As a result, there is more variation in the cause data inputted to the prediction model, and the prediction accuracy is expected to be improved.

In order to confirm the effect of Example 1, the image forming apparatus 100 was installed in an environment test room having a temperature of 23° C. and a humidity of 50%. The size of the sheet S (image size) was A4. An image ratio of a solid density was assumed to be 100%. The image ratio of the test pattern was 10%. Images were continuously formed on 500 sheets S. The 500 sheets S include a sheet S on which a test pattern is formed. The test pattern formed on the sheet S was measured by an auto scan spectrophotometer FD-9 manufactured by Konica Minolta Inc., and a color difference $\Delta E76$ was calculated. Here, in order to focus only on the effect of the prediction calibration, the influence of the actual measurement calibration is ignored. In order to compare prediction accuracy (the error of predicted density with respect to measured density) depending only on the type of data used in the calculation of the predicted density, each measurement result is converted into a maximum color difference $\Delta E76$ of a single color.

Figure 9A:
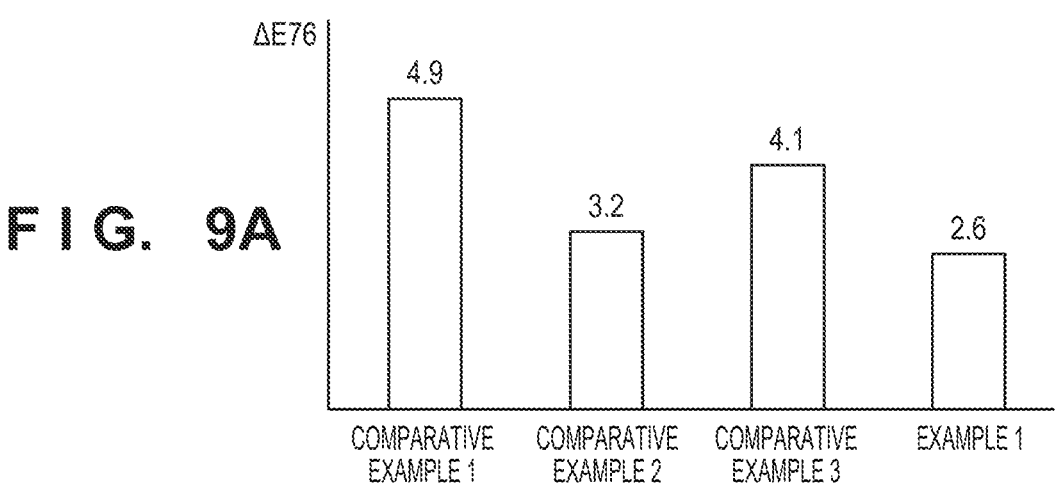
FIGS. 9A to 9C are views illustrating test results.

FIG. 9A illustrates differences (converted into color differences $\Delta E76$) between the measured densities and the predicted densities obtained in Example 1 and Comparative Examples 1 to 3. A lesser color difference $\Delta E76$ means a higher prediction accuracy. Comparative Example 1 is a case when the density is predicted only from X1 to X8, and the first density data X9 and the second density data X10 are not used for predicting the density. Comparative Example 2 is a case when X1 to X9 are used for prediction, but second density data X10 is not used for prediction. Comparative Example 3 is a case when X1 to X8 and X10 are used for density prediction, but first density data X9 is not used for prediction.

The color difference of Comparative Example 1 was $\Delta E4.9$, while the color difference of Comparative Example 2 was $\Delta E3.2$. This may be because Comparative Example 2 uses the previously acquired first density data X9. The color difference of Comparative Example 3 is $\Delta E4.1$. In Comparative Example 3, the second density data X10 is used without using the first density data X9. As described above, since n>m, Comparative Example 3 is inferior to Comparative Example 2. In Example 1, all of X1 to X10 are used. Therefore, the color difference in Example 1 was $\Delta E2.6$, which was the most excellent.

As such, Example 1 has superior predictive power, which contributes to generating a more accurate $\gamma$ LUT 590. That is, it becomes easier to maintain the tone characteristic of the image forming apparatus 100 at the target characteristic thereby. Further, a test pattern for acquiring the first density data X9 and the second density data X10 used by the prediction calibration is not formed in the prediction calibration. Therefore, the execution time of the prediction calibration is not increased by the formation of the test pattern. As described above, in Example 1, it is easy to maintain the tone characteristic at a target characteristic while suppressing an increase in downtime.

(5-2) Example 2

FIG. 8B is a view illustrating input values for the prediction model in Example 2. In Example 1, a pair of Definitions 03 and 04 was used, while in Example 2, a pair of Definitions 05 and 06 was used. That is, Definition 05 is used to acquire the first density data X9, and Definition 06 is used to acquire the second density data X10.

As illustrated in FIG. 7, Definition 05 defines that an unfixed test pattern, which is formed with the $\gamma$ LUT turned on and is carried on the intermediate transfer belt 8, is detected by the density sensor 31. Definition 06 defines that an unfixed test pattern, which is formed with the $\gamma$ LUT turned on and is carried on the intermediate transfer belt 8, is detected by the density sensor 31. In Definitions 05 and 06, since the carrier is the intermediate transfer belt 8, the density sensor 32 is used.

Figure 9B:
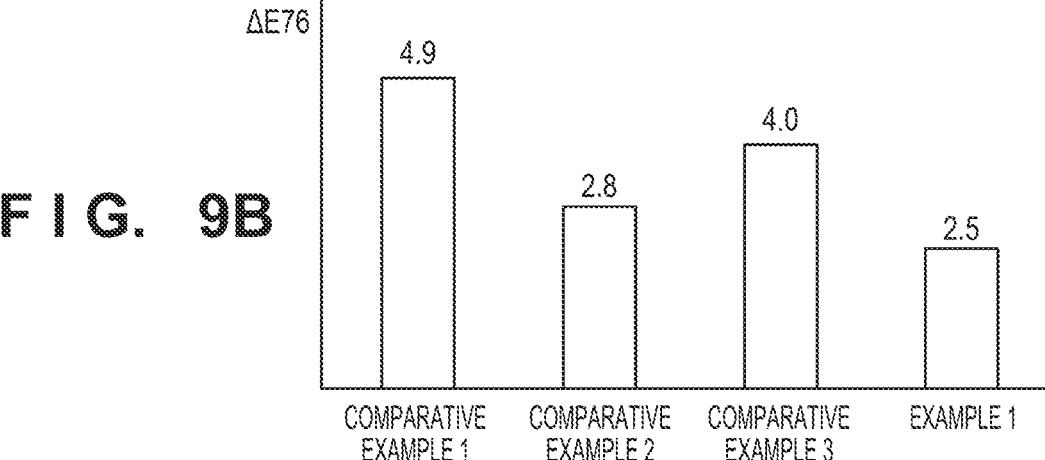

FIG. 9B illustrates differences between the measured densities and the predicted densities obtained in Example 2 and Comparative Examples 1 to 3. Comparative Example 1 is as previously described. Here, in Comparative Examples 2 and 3, the density is predicted by using the detection result of the density sensor 32 as in Example 2.

The color difference of Comparative Example 1 was $\Delta E4.9$, while the color difference of Comparative Example 2 was $\Delta E2.8$. This may be because Comparative Example 2 uses the previously acquired first density data X9. Further, it can be seen that the detection result of the test pattern on the intermediate transfer belt 8 improves the prediction accuracy more than the detection result of the test pattern on the photoconductor drum 1. The color difference of Comparative Example 3 is $\Delta E4.0$. The detection result of the test pattern on the intermediate transfer belt 8 improves the prediction accuracy more than the detection result of the test pattern on the photoconductor drum 1. In Example 2, all of X1 to X10 are used. Therefore, the color difference in Example 2 was $\Delta E2.5$, which was the most excellent.

The prediction accuracy of Example 2 is higher than the prediction accuracy of Example 1. The reason for this is that in the electrophotographic process, the density data acquired at a position close to the sheet S appropriately indicates the density change of the image on the sheet S.

As such, Example 2 has superior predictive power, which contributes to generating a more accurate $\gamma$ LUT 590. That is, it becomes easier to maintain the tone characteristic of the image forming apparatus 100 at the target characteristic thereby. Further, a test pattern for acquiring the first density data X9 and the second density data X10 used by the prediction calibration is not formed in the prediction calibration. Therefore, the execution time of the prediction calibration is not increased by the formation of the test pattern. As described above, in Example 2, it is easy to maintain the tone characteristic at the target characteristic while suppressing an increase in downtime.

(5-3) Example 3

FIG. 8C is a view illustrating input values for the prediction model in Example 3. In Example 2, a pair of Definitions 05 and 06 was used, while in Example 3, a pair of Definitions 01 and 02 was used. That is, Definition 01 is used to acquire the first density data X9, and Definition 02 is used to acquire the second density data X10.

As illustrated in FIG. 7, Definition 01 defines that a test pattern, which is formed with the $\gamma$ LUT turned on and is fixed to the sheet S, is detected by the density sensor 34. Definition 02 defines that a test pattern, which is formed with the $\gamma$ LUT turned on and fixed to the sheet S, is detected by the density sensor 34. In Definitions 01 and 02, since the carrier is the sheet S, the density sensor 34 is used.

Figure 9C:
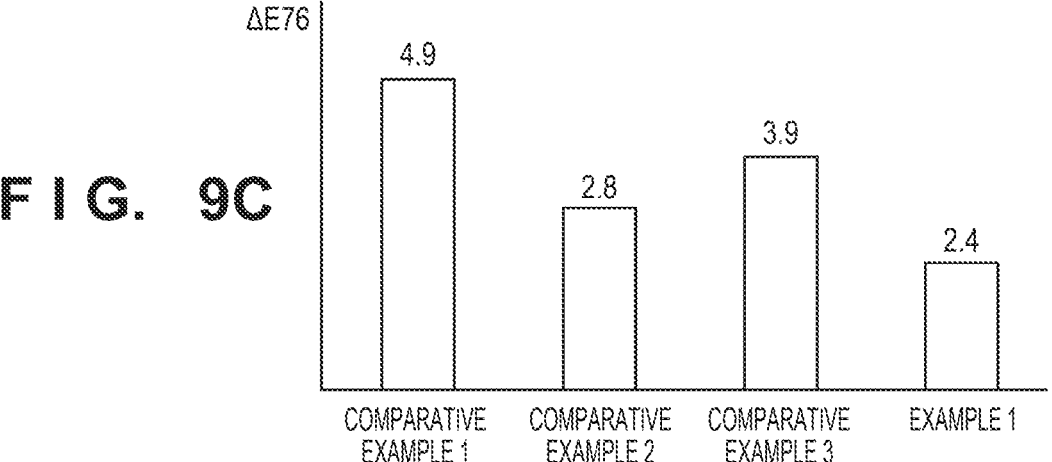

FIG. 9C illustrates differences between the measured densities and the predicted densities obtained in Example 3 and Comparative Examples 1 to 3. Comparative Example 1 is as previously described. Here, in Comparative Examples 2 and 3, the density is predicted by using the detection result of the density sensor 34 as in Example 3.

The color difference of Comparative Example 1 was ΔE4.9, while the color difference of Comparative Example 2 was ΔE2.8. This may be because Comparative Example 2 uses the previously acquired first density data X9. Further, it can be seen that the detection result of the test pattern on the sheet S improves the prediction accuracy more than the detection result of the test pattern on the photoconductor drum 1. The color difference of Comparative Example 3 is ΔE3.9. The detection result of the test pattern on the sheet S improves the prediction accuracy more than the detection result of the test pattern on the photoconductor drum 1. In Example 3, all of X1 to X10 are used. Therefore, the color difference in Example 3 was ΔE2.4, which was the most excellent.

The prediction accuracy of Example 3 is higher than the prediction accuracy of Example 1 and the prediction accuracy of Example 2. The reason for this is that in the electrophotographic process, the density data acquired at a position close to the sheet S appropriately indicates the density change of the image on the sheet S.

As such, Example 3 has superior predictive power, which contributes to generating a more accurate γ LUT 590. That is, it becomes easier to maintain the tone characteristic of the image forming apparatus 100 at the target characteristic thereby. Further, a test pattern for acquiring the first density data X9 and the second density data X10 used by the prediction calibration is not formed in the prediction calibration. Therefore, the execution time of the prediction calibration is not increased by the formation of the test pattern. As described above, in Example 3, it is easy to maintain the tone characteristic at the target characteristic while suppressing an increase in downtime.

In Example 3, it is necessary to form a test pattern on the sheet S. Therefore, if the size of the sheet S is too small, it is impossible to form the test pattern, and Example 3 cannot be applied. In this case, Examples 1 and 2, which do not require the sheet S, may be applied. For example, if the size of the sheet S is greater than or equal to a threshold, the CPU 201 executes Example 3. If the size of the sheet S is not greater than or equal to the threshold, the CPU 201 executes Example 1 or Example 2.

(6) Prediction Unit Configuration Example (6-1) Prediction Model for Each Reference Density FIG. 10 illustrates an example of the prediction unit 512. Here, it is assumed that n=10. In step S622, the prediction unit 512 executes calculation processing for deriving ten prediction densities Dpre1 to Dpre10 corresponding to ten tones. The prediction unit 512 takes first density data X9 including 10 reference densities Dtgt1 to Dtgt10 as input.

The prediction unit 512 includes a model selection unit 1000, ten prediction models 1001 to 1010, and an output unit 1020. The model selection unit 1000 selects a prediction model corresponding to the inputted reference density Dtgt1 (i is any of 1 to 10). For example, the model selection unit 1000 obtains the maximum density of the 10 reference densities Dtgt1 to Dtgt10, divides the 10 reference densities Dtgt1 to Dtgt10 by the maximum density, and multiplies by 100 to obtain a ratio (%) with respect to the maximum density. If the ratio of the density of interest is 0% or more and less than 10%, the model selection unit 1000 inputs the density of interest to a prediction model 1001. Similarly, if the ratio of the density of interest is 10% or more and less than 20%, the model selection unit 1000 inputs the density of interest to a prediction model 1002. If the ratio of the density of interest is 20% or more and less than 30%, the model selection unit 1000 inputs the density of interest to a prediction model 1003. If the ratio of the density of interest is 30% or more and less than 40%, the model selection unit 1000 inputs the density of interest to a prediction model 1004. If the ratio of the density of interest is 90% or more and 100% or less, the model selection unit 1000 inputs the density of interest to a prediction model 1010.

In addition to the density data Dtgt outputted from the model selection unit 1000, the environment parameters X1 to X8 and the second density data X10 are also inputted into the prediction models 1001 to 1010. The prediction models 1001 to 1010 respectively output predicted densities Dpre1 to Dpre10, which are output values based on these input values. The output unit 1020 stores the predicted densities Dpre1 to Dpre10 in the memory 202 or outputs them to the LUT creation unit 514.

Note that the output unit 1020 outputs a predicted density Dpre based on a relationship between a reference density inputted into the model selection unit 1000 and an input signal. For example, the reference density Dtgt1 corresponds to a 10% input signal. Therefore, the output unit 1020 outputs the inputted predicted density Dpre as predicted density Dpre1. Similarly, when the reference density Dtgt2 is inputted, the predicted density Dpre2 is outputted. As a consequence, the predicted density characteristic 304 illustrated in FIG. 3B is obtained.

As described above, the prediction unit 512 may include n prediction models prepared for n reference densities (first density data) respectively. The n prediction models are switched in accordance with the input reference density. That is, the prediction accuracy will be improved by providing n (learned) prediction models appropriately created in accordance with the inputted density data.

In FIG. 10, an example of n=10 is illustrated, but this is only an example. Here, n may be a natural number less than ten, or may be a natural number greater than ten. For example, n may be small if the relationship between the input signal and the density is close to a linear relationship. This is because, if it is linear, the accuracy of the interpolation processing increases. Conversely, if the relationship between the input signal and the density is a nonlinear relationship, increasing n will result in a more accurate predicted density.

(6-2) Prediction Model for Each Tone

Figure 11:
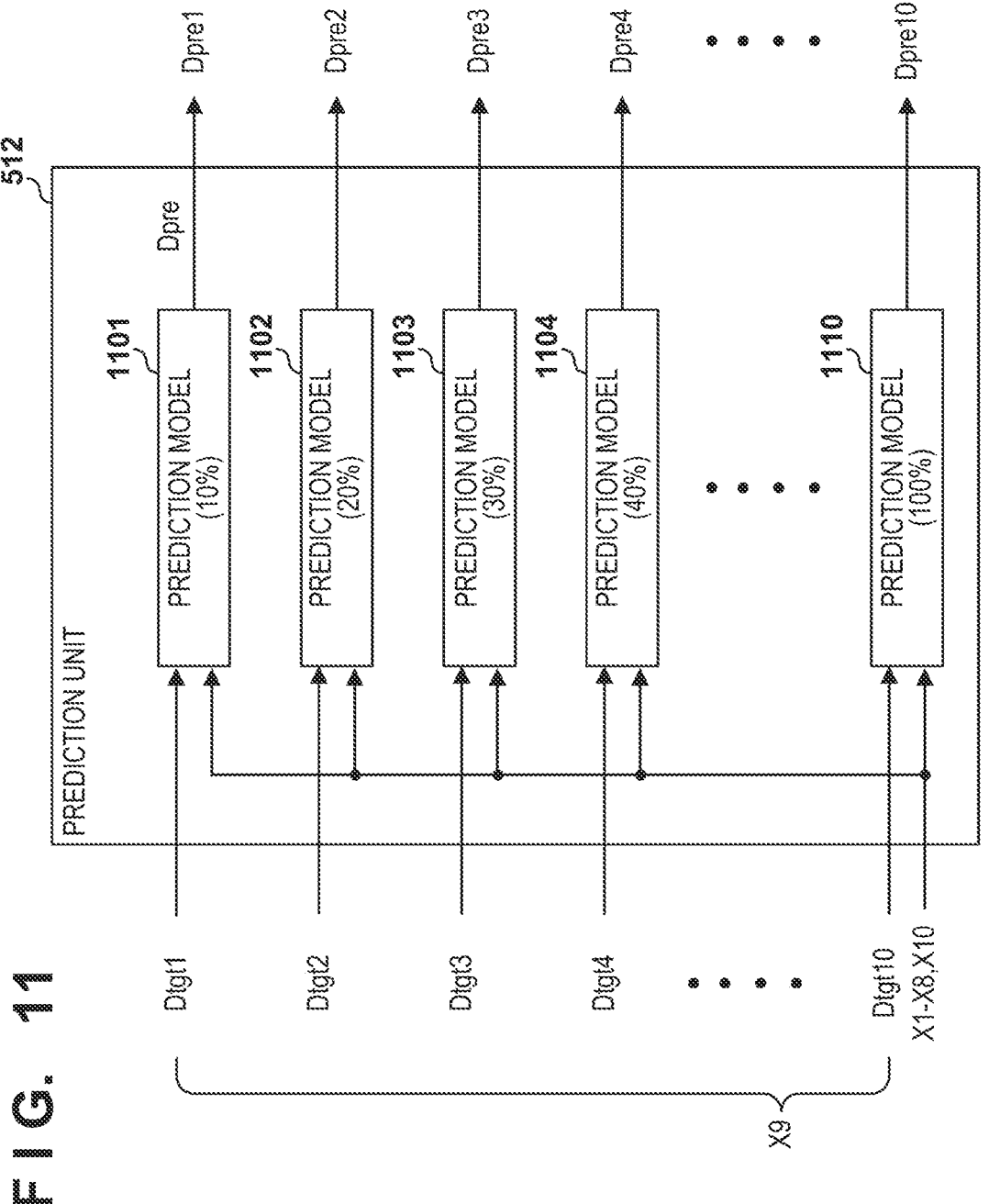
FIG. 11 is a view for describing the prediction unit.

FIG. 11 illustrates another example of the prediction unit 512. Here, it is assumed that n=10. In step S622, the prediction unit 512 executes calculation processing for deriving ten prediction densities Dpre1 to Dpre10 corresponding to ten tones. The prediction unit 512 takes first density data X9 including 10 reference densities Dtgt1 to Dtgt10 as input.

The prediction unit 512 includes prediction models 1101 to 1110 for the respective tones. The prediction model 1101 is a prediction model for a test pattern formed when the input signal is 10%. That is, the reference density Dtgt1, the environment parameters X1 to X8, and the second density data X10 of the first density data X9 are inputted into the prediction model 1101. The prediction model 1101 outputs the predicted density Dpre1. That is, the reference density Dtgt2, the environment parameters X1 to X8, and the second density data X10 of the first density data X9 are inputted into the prediction model 1102. The prediction model 1102 outputs the predicted density Dpre2. That is, the reference density Dtgt3, the environment parameters X1 to X8, and the second density data X10 of the first density data X9 are inputted into the prediction model 1103. The prediction model 1103 outputs the predicted density Dpre3. That is, the reference density Dtgt4, the environment parameters X1 to X8, and the second density data X10 of the first density data X9 are inputted into the prediction model 1104. The prediction model 1104 outputs the predicted density Dpre4. That is, the reference density Dtgt10, the environment parameters X1 to X8, and the second density data X10 of the first density data X9 are inputted into the prediction model 1110. The prediction model 1110 outputs the predicted density Dpre10. As a result, 10 predicted densities (white ○s) in FIG. 3B are obtained. By interpolating and smoothing the ten predicted densities, predicted density characteristics are obtained.

According to FIG. 11, there is one prediction model for a given input signal. Thus, a prediction algorithm suitable for each level of the input signal is selected in advance. That is, the creation accuracy (learning accuracy) of the prediction model is improved. This is particularly effective in the case when the variation in density is highly correlated to the level of the input signal.

In FIG. 11, an example of n=10 is illustrated, but this is only an example. Here, n may be a natural number less than ten, or may be a natural number greater than ten. For example, n may be small if the relationship between the input signal and the density is close to a linear relationship. This is because, if it is linear, the accuracy of the interpolation processing increases. Conversely, if the relationship between the input signal and the density is a nonlinear relationship, increasing n will result in a more accurate predicted density.

(6-3) Multiple Reference Densities are Inputted into One Prediction Model

In FIG. 10 and FIG. 11, it is assumed that the first density data X9 inputted into the prediction model is one piece of density data. However, a plurality of pieces of density data included in the first density data X9 may be inputted into one prediction model.

FIG. 12 illustrates another example of the prediction unit 512. Here, it is assumed that n=10. In step S622, the prediction unit 512 executes calculation processing for deriving ten prediction densities Dpre1 to Dpre10 corresponding to ten tones. The prediction unit 512 takes first density data X9 including 10 reference densities Dtgt1 to Dtgt10 as input.

The prediction unit 512 includes 10 prediction models 1201 to 1210. The prediction models 1201 to 1210 correspond to ten input signals having different tone levels. However, three reference densities are inputted into each of the prediction models 1201 to 1210. For example, the reference densities Dtgt1, Dtgt2, and Dtgt3 included in the first density data X are inputted into the prediction model 1201. The reference densities Dtgt8, Dtgt9, and Dtgt10 included in the first density data X are inputted into the prediction model 1210. Since three reference densities are required per prediction model, a total of twelve reference densities are required for 10 prediction models. However, the first density data X9 has only ten reference densities Dtgt1 to Dtgt10. Accordingly, the reference densities Dtgt1, Dtgt2, and Dtgt3 are inputted into the prediction model 1202. Similarly, the reference densities Dtgt8, Dtgt9, and Dtgt10 are inputted into the prediction model 1210. As described above, the same reference density group may be input to some of the prediction models 1201 to 1210.

Three pieces of density data included in the first density data X9, the environment parameters X1 to X8, and the second density data X10 are inputted into each of the prediction models 1201 to 1210. The prediction models 1201 to 1210 obtain and output a predicted density Dpre1 to Dpre10, respectively. As a result, 10 predicted densities (white ○s) in FIG. 3B are obtained. By interpolating and smoothing the ten predicted densities, predicted density characteristics are obtained.

As described above, in FIG. 12, the number of pieces of density data inputted into the prediction model increases as compared with FIG. 11. It should be noted that the three pieces of density data inputted into one prediction model are pieces of density data close to each other in value. This means that the tone levels of the three input signals upon which the three density data are based are also close. As described above, it is considered that the prediction accuracy of the density is further improved by increasing the number of pieces of density data inputted into the prediction model. In particular, by inputting k pieces of density data whose values are close to each other (e.g., k=3) in the first density data X9 into the prediction model, the prediction accuracy of the density may be improved. Here, k may be set by determining a trade-off between computation time and prediction accuracy through testing or simulation. Thus, k may be greater than or equal to 2 and less than n.

(7) Prediction Model Creation Method (7-1) Learning System

Figure 13:
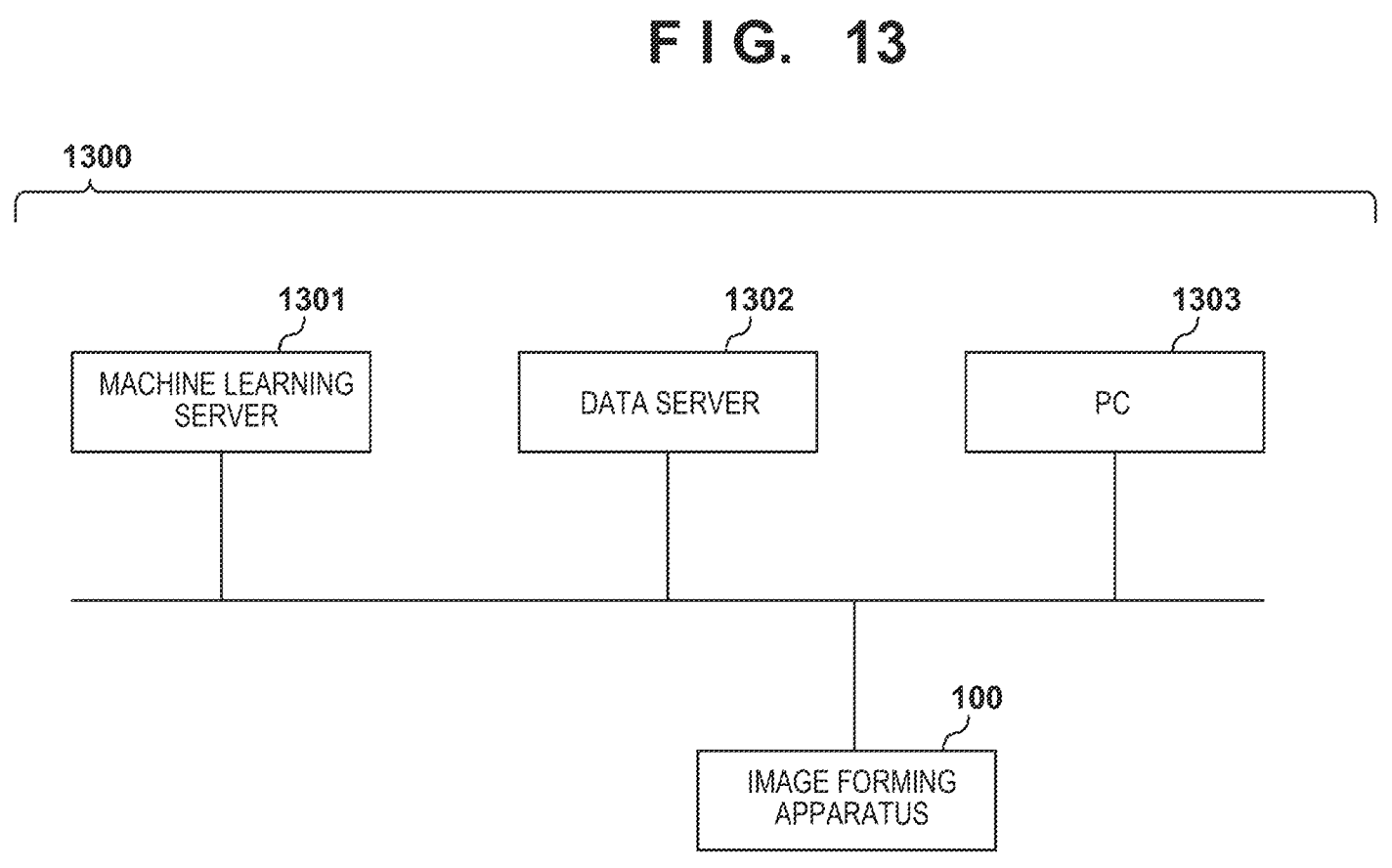

FIG. 13 illustrates a learning system 1300 that creates a prediction model group as a learning model. The learning system 1300 may include one or more image forming apparatuses 100, a machine learning server 1301, a data server 1302, and a PC 1303. The PC 1303 is a general-purpose computer that transmits print data to the image forming apparatuses 100, or the like. These information processing apparatuses are connected to each other via the Internet, a wireless LAN, or a wired LAN. "LAN" is an abbreviation for "local area network". The image forming apparatuses 100 have an artificial intelligence (AI) function. A learning model (prediction model) for realizing the AI function is created by the machine learning server 1301.

The machine learning server 1301 receives learning data (e.g., input value X and teacher value T) required for learning a learning model for realizing a particular AI function from an external device such as the data server 1302, the image forming apparatus 100, and the PC 1303. The machine learning server 1301 performs learning processing using some or all of the received learning data.

The data server 1302 collects learning data (e.g., input value X) used to perform machine learning in the machine learning server 1301 from an external device and provides the learning data to the machine learning server 1301. The image forming apparatus 100 downloads a prediction model, which is a learned model generated by the machine learning server 1301, from the machine learning server 1301 and uses the prediction model for density prediction.

The data collected from the image forming apparatus 100 by the data server 1302 reflects a situation specific to the user who operates the image forming apparatus 100. Accordingly, the machine learning server 1301 may learn such data to generate a highly accurate learning model.

(7-2) Machine Learning Server and Data Server

Figure 14A:
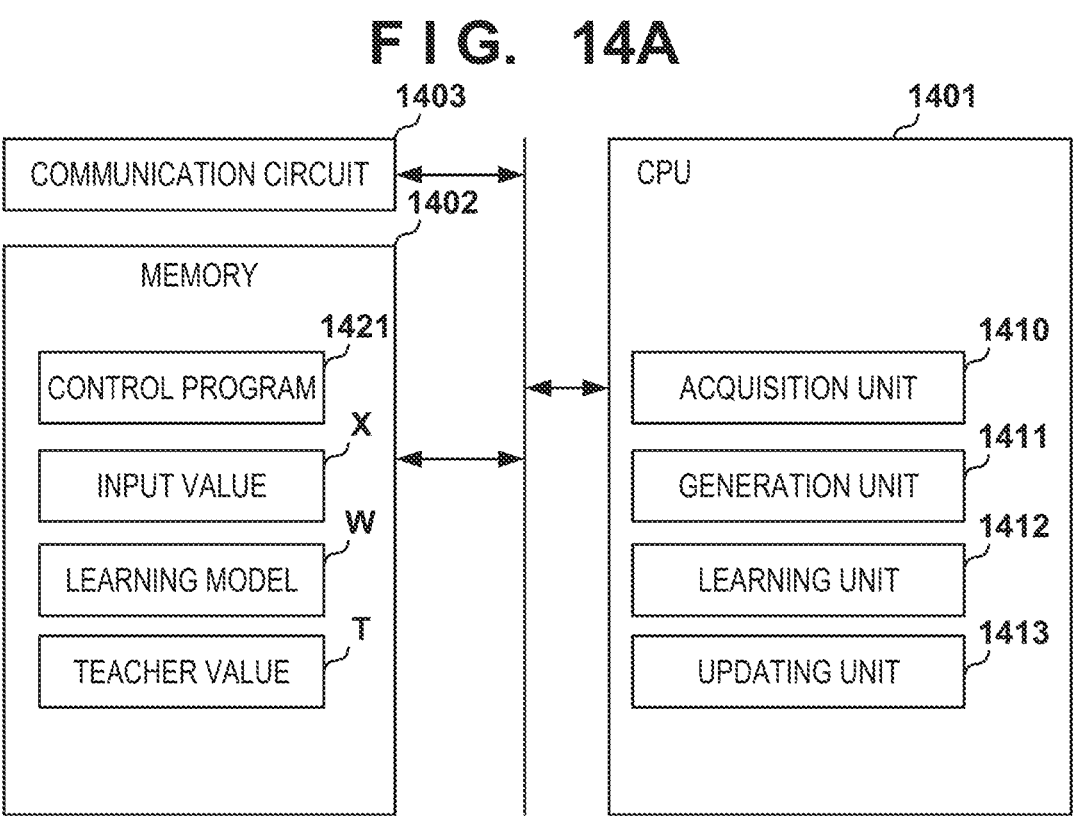
FIGS. 14A and 14B are views for describing a structure of a server.

FIG. 14A illustrates the machine learning server 1301. A CPU 1401 implements various functions as the machine learning server 1301 in accordance with a control program 1421 stored in a memory 1402. The memory 1402 may include a RAM, a ROM, an HDD, an SSD, or the like. A communication circuit 1403 is a communication circuit for communicating with the image forming apparatus 100, the data server 1302, the PC 1303, and the like. The communication circuit 1403 includes a transmission circuit and a reception circuit.

The CPU 1401 includes an acquisition unit 1410, a generation unit 1411, a learning unit 1412, and an updating unit 1413. The acquisition unit 1410 communicates with the image forming apparatus 100, the data server 1302, or the PC 1303 via the communication circuit 1403, acquires the input values X1 to X10, the teacher value T, and the like, and stores them in the memory 1402. The generation unit 1411 creates learning data (input value) by converting non-digitized information such as information indicating the type of the sheet S into numerical values. The generation unit 1411 may remove noise data from the data group received from the data server 1302. This improves the learning effect. The learning unit 1412 applies the input value X to a learning model W, and calculates weighting coefficients that define the learning model W so that a loss L of an output value Y from the learning model W with respect to the teacher value T becomes small. The updating unit 1413 updates the learning model (prediction model) stored in the image forming apparatus 100.

In a learning method such as deep learning, a large number of parallel processes is required. Therefore, a part or all of the CPU 1401 learning processing may be executed by a GPU.

Figure 14B:
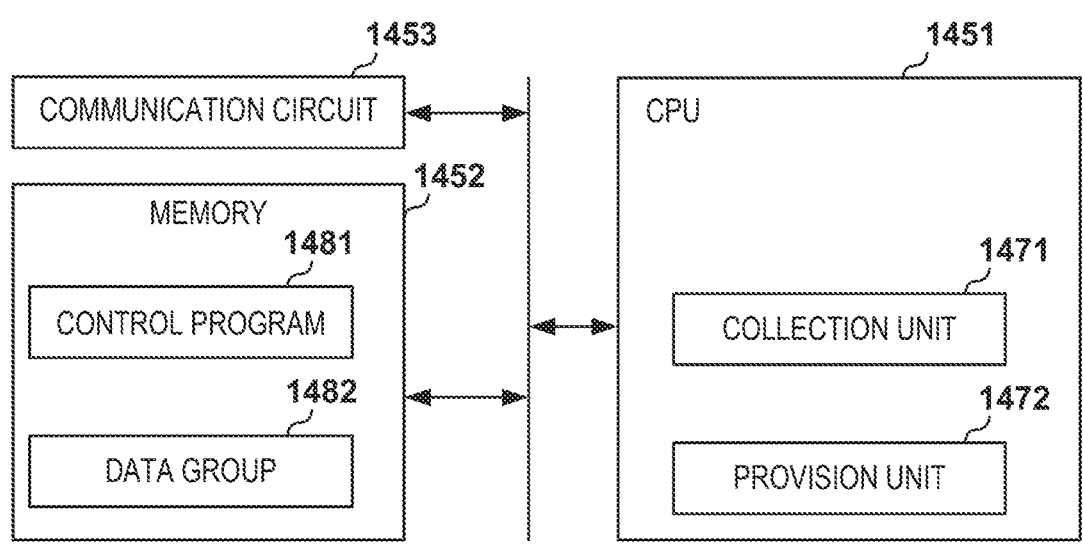

FIG. 14B illustrates the data server 1302. A CPU 1451 implements various functions as the data server 1302 in accordance with a control program 1481 stored in a memory 1452. The memory 1452 may include a RAM, a ROM, an HDD, an SSD, or the like. A communication circuit 1453 is a communication circuit for communicating with the image forming apparatus 100, the machine learning server 1301, the PC 1303, and the like. The communication circuit 1453 includes a transmission circuit and a reception circuit.

A collection unit 1471 collects a data group 1482 uploaded from the plurality of image forming apparatuses 100, and stores the data group in the memory 1452. The data group 1482 includes the environment parameters X1 to X8, the first density data X9, and the second density data X10 for each of the image forming apparatuses 100. When the data group 1482 is requested from the machine learning server 1301, a provision unit 1472 reads the data group 1482 from the memory 1452. The provision unit 1472 provides (transmits) the data group 1482 to the machine learning server 1301 via the communication circuit 1453.

(7-3) Learning Model

FIG. 15A is a view for describing the learning model W using a neural network. When the input value X is given, the learning model W calculates the output value Y in accordance with the weighting coefficients ai to cj. i and j are indices. The weighting coefficients ai to cj are coefficients obtained by learning. In other words, "learning" of the learning model W means determining the weighting coefficients ai to cj so that an appropriate output value Y can be obtained for the input value X.

The input value X is a set value or a measured value that can be acquired when the image forming apparatus 100 executes image forming and is information useful for predicting the density when the image forming is not executed. Examples of the input value X include the environment parameters X1 to X8, the first density data X9, and the second density data X10. The environment parameters X1 to X8 are environment parameters that can cause density variation.

When the input value X is limited to a numerical value, the generation unit 1411 converts the data into a numerical value. Such data may include a type of sheet S, a printing method (double-sided/single-sided), an operation state (continuous operation/intermittent operation), and the like. One-hot encoding or the like can be used as a conversion method.

Specific algorithms for machine learning include Nearest Neighbor Method, Naive Bayes Method, Decision Tree, Support Vector Machine, and the like, as well as neural nets. Further, deep learning in which feature amounts for learning and coupling weighting coefficients are generated using a neural network can be given as an example.

FIG. 15B illustrates an operation of the learning unit 1412. The learning unit 1412 gives an input value X to the learning model W and causes the learning model W to output an output value Y. An error detection unit 1501 obtains an error between the output value Y and the teacher value T. This error may be obtained by using a loss function that inputs the output value Y and the teacher value T and outputs the loss value L. In this case, the error is the loss value L.

The learning unit 1412 updates the weighting coefficients ai to cj so that the loss value L becomes smaller. For example, the learning unit 1412 may update the weighting coefficients ai to cj using back propagation. Back propagation is a method of adjusting the coupling weighting coefficients (weighting coefficients ai to cj) between nodes of a neural network so as to reduce an error.

By preparing a large amount of learning data in which "input data (input value) having a known correct answer value" and "correct answer values (teacher values)" are set, a highly accurate learning model W is generated. This is called a learning process. The learning model adjusted through the learning process is particularly referred to as a learned model. The learning model W is not limited to the learning model generated by deep learning. The learning model W may be a learning model based on linear regression or nonlinear regression. The learning model W may be a time-series model in which input data is used as time-series data. The learning model may be an ensemble model obtained by combining the plurality of models. The learning model W may be any model as long as it multiplies the input data by known coefficients to obtain a correct answer value.

(8) Other

As described above, the accuracy of density prediction is improved by using the second density data X10 in addition to the environment parameters X1 to X8 and the first density data X9. Although various examples have been described with respect to the first density data X9 and the second density data X10, these are merely examples. In addition to the environment parameters X1 to X8 and the first density data X9, types and numbers of the second density data X10 may be freely combined.

For example, the density of the test pattern fixed on the sheet S that can be acquired by the reader 150 or the density sensor 34 may be adopted as the first density data X9. The first density data X9 may be the density of an unfixed test pattern on the intermediate transfer belt 8, which can be acquired by the density sensor 32 or the density of an unfixed test pattern on the sheet S, which can be acquired by the density sensor 33. The first density data X9 may be the density of the test pattern formed based on image data corrected by the γ LUT 590.

The second density data X10 is similar to the first density data X9. For example, the density of the test pattern fixed on the sheet S that can be acquired by the reader 150 or the density sensor 34 may be adopted as the second density data X10. The second density data X10 may be the density of an unfixed test pattern on the intermediate transfer belt 8, which can be acquired by the density sensor 32 or the density of an unfixed test pattern on the sheet S, which can be acquired by the density sensor 33. The second density data X10 may be the density of the test pattern formed based on image data not corrected by the γ LUT 590. The density data included in the second density data X10 may be acquired from a test pattern of single tone, or may be acquired from a test pattern of multiple tones.

The number and type of environment parameters X1 to X8 are also merely examples. The environment parameters X1 to X8 may be data of an event that could be a cause in density variation. For example, the environment parameters X1 to X8 may include an elapsed time from the time when the first density data X9 or the second density data X10 is acquired. The environment parameters X1 to X8 may be a change amount or a change ratio of an environment value (e.g., temperature).

<Technical Concepts Derived from Examples>

(Item 1)

According to Item 1, it is possible to improve the accuracy of prediction calibration without increasing the frequency of actual measurement calibration. That is, an increase in downtime is suppressed, and the tone characteristic is more easily maintained at the target characteristic. Here, m may be a natural number smaller than n. The second density data may be acquired for a purpose (adjustment processing of the image forming apparatus 100) different from the tone correction table. Accordingly, an increase in downtime may be further suppressed.

(Item 2)

Since the acquisition condition of the first density data and the acquisition condition of the second density data are different from each other, the information used for the prediction becomes rich, and thus the prediction accuracy will be improved.

(Item 3)

The information used for the prediction may be made richer by turning on/off the tone correction table applied to the test pattern.

(Item 4)

By changing the acquisition timing of the density, information used for prediction may be made richer.

(Item 5)

By changing the number of screen lines, information used for prediction may be made richer.

(Item 6)

By changing the number of test patterns, information used for prediction may be made richer.

(Item 7)

By changing the number of test patterns (the number of tone levels), information used for prediction may be made richer.

(Item 8)

The density sensor 31 is an example of a density detecting element. Note that the density detecting element for the first test pattern and the density detecting element for the second test pattern may be different from each other.

(Item 9)

The density sensor 32 is an example of a density detecting element. Note that the density detecting element for the first test pattern and the density detecting element for the second test pattern may be different from each other.

(Item 10)

The density sensor 33 is an example of a density detecting element. Note that the density detecting element for the first test pattern and the density detecting element for the second test pattern may be different from each other.

(Item 11)

The density sensor 34 and the reader 150 are examples of density detecting elements. Note that the density detecting element for the first test pattern and the density detecting element for the second test pattern may be different from each other.

(Item 12)

There may be one or a plurality of prediction models. By increasing the variation of the input value with respect to the learned prediction model in this way, the prediction accuracy will be improved.

(Item 13)

Each of the n prediction models may be associated with the n first test patterns in a one-to-one manner. The i-th prediction model receives, as input, the environment condition, the density data of the i-th first test pattern of the first density data, and the second density data, and outputs the i-th predicted density data (i is a natural number from 1 to n). This improves prediction accuracy.

(Item 14)

Different prediction models may be selected depending on the input values. This improves prediction accuracy.

(Item 15)

A maximum value may be determined for a plurality of input values, and a prediction model may be selected according to a ratio of the input value to the maximum value. This improves prediction accuracy.

(Item 16)

As illustrated in FIG. 12, a plurality of pieces of density data may be inputted from the first density data X9 into one prediction model. For example, each of the n prediction models may be associated with the n first test patterns in a one-to-k manner. The i-th prediction model receives, as input, the environment condition, k pieces of density data among the n pieces of density data included in the first density data, and the second density data, and outputs the i-th predicted density data. Note that the combination of k pieces of density data inputted into the i-th prediction model and the combination of k pieces of density data inputted into the i+1-th prediction model may be different. Here, k is a natural number greater than or equal to 2 and less than n. This improves prediction accuracy.

(Item 17)

As illustrated in FIG. 12, in adjacent prediction models, the input values may be input in an overlapping manner. Note that the combination of k pieces of density data inputted into the i-th prediction model and the combination of k pieces of density data inputted into the i+1-th prediction model may be partially overlapping density data. This improves prediction accuracy.

(Item 18)

As illustrated in FIG. 12, combinations of the plurality of pieces of density data inputted to the prediction model may be values close to each other. This improves prediction accuracy.

(Item 19)

As illustrated in FIG. 2, the halftone processing unit 208 is an example of a binarization circuit.

(Item 20)

As described with respect to FIG. 6, the CPU 201 is an exemplary control circuit. At least the first condition and the third condition are different from each other.

(Item 21)

By collecting data for learning from the image forming apparatus, a prediction model may be generated with high accuracy.

(Item 22)

The prediction model may be updated or upgraded with additional learning or reinforcement learning. This improves predicted density accuracy.

(Item 23)

The CPU 201 causes an image forming unit (e.g., the photoconductor drum 1, the charger 2, the laser scanner 7, the developing device 3, the primary transfer unit 6, the intermediate transfer belt 8, the outer roller 12, and the fixing device 20) to form a first pattern image of the first number of tone levels. The CPU 201 executes a first calibration to generate a first image forming condition based on the detection result of the first pattern image detected by the sensor. The CPU 201 acquires first information correlated with the density of the image formed by the image forming unit at the first timing related to the execution of the first calibration. The CPU 201 acquires second information correlated with the density of the image formed by the image forming unit at a second timing after the first timing. The CPU 201 causes the image forming unit to form a second pattern image of the second number of tone levels. The CPU 201 executes a second calibration for generating a second image forming condition based on the first information, the second information, the detection result of the second pattern image detected by the sensor, and the first image forming condition. The second number of tone levels is fewer than the first number of tone levels. The CPU 201 causes the image forming unit to form an image based on the image data and the first image forming condition before the second calibration is executed. When the second image forming condition is generated in the second calibration, the CPU 201 causes the image forming unit to form an image based on the image data and the second image forming condition. The second pattern image may be formed to detect a charge amount of the toner. The image forming condition may be a conversion condition used to convert the image data. The image forming unit may form the first pattern image based on first pattern image data converted based on the conversion condition. The image forming unit may form the second pattern image based on second pattern image data without using a conversion condition. Both the first information and the second information may include environment information, information regarding the number of sheets on which an image is formed by the image forming apparatus, information regarding the rotation time of the photoconductor, and information regarding the rotation time of the intermediate transfer member. The CPU 201 may execute the first calibration every time images to be transferred are formed on the first number of sheets. The CPU 201 may execute the second calibration every time images to be transferred are formed on the second number of sheets, which is fewer than the first number of sheets. The CPU 201 may control whether or not to form the second pattern image based on the image data. The CPU 201 may control whether or not to form the second pattern image based on the amount of toner consumed in the image formed based on the image data. The CPU 201 may be configured to analyze the image data to calculate the amount of the toner consumed. Alternatively, the CPU 201 may use a toner sensor provided in the toner container of the developing device 3 to detect the amount of toner consumed.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or an apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus that forms an image on a sheet, the image forming apparatus comprising:

an image forming unit configured to acquire image data and form an image based on the image data and an image forming condition;

a sensor configured to detect a pattern image formed by the image forming unit; and a controller configured:

to control the image forming unit to form a first pattern image of a first number of tone levels;

to execute a first calibration for generating a first image forming condition based on a detection result of the first pattern image detected by the sensor;

to control the image forming unit to form a second pattern image of a second number of tone levels less than the first number of tone levels;

to acquire information having a correlation to a density of an image to be formed by the image forming unit; and to execute a second calibration for generating a second image forming condition based on the detection result of the second pattern image detected by the sensor, the acquired information, and the first image forming condition.

2. The image forming apparatus according to claim 1, wherein the controller determines a predicted density based on the detection result of the second pattern image detected by the sensor and the acquired information, and, in the second calibration, the controller generates the second image forming condition based on the predicted density and the first image forming condition.

3. The image forming apparatus according to claim 1, wherein the information includes:

first information that has a correlation to a density of an image to be formed by the image forming unit, the first information being acquired at a first timing pertaining to the execution of the first calibration, and second information that has a correlation to a density of an image to be formed by the image forming unit, the second information being acquired at a second timing after the first timing.

4. The image forming apparatus according to claim 1, wherein the image forming unit forms an image based on the image data and the first image forming condition before the second calibration is executed, and the image forming unit forms an image based on the image data and the second image forming condition in a case when the second image forming condition is generated in the second calibration.

5. The image forming apparatus according to claim 1, wherein the image forming unit forms the image using a toner, and the second pattern image is formed in order to detect a charge amount of the toner.

6. The image forming apparatus according to claim 1, wherein an image forming condition that the image forming unit uses in order to form the second pattern image differs from an image forming condition that the image forming unit uses in order to form the first pattern image.

7. The image forming apparatus according to claim 1, wherein the image forming condition is a conversion condition used in order to convert the image data.

8. The image forming apparatus according to claim 7, wherein the image forming unit forms the first pattern image based on first pattern image data converted based on the conversion condition, and the image forming unit forms the second pattern image based on second pattern image data without using a conversion condition.

9. The image forming apparatus according to claim 1, further comprising an environment sensor configured to detect environment information, wherein the information includes the environment information detected by the environment sensor.

10. The image forming apparatus according to claim 1, wherein the information includes information related to a number of sheets on which an image is formed by the image forming apparatus.

11. The image forming apparatus according to claim 1, wherein the image forming unit includes:

a photoconductor;

a light source configured to expose the photoconductor to form an electrostatic latent image; and a developing sleeve configured to develop the electrostatic latent image on the photoconductor using a toner, wherein the information includes information related to a rotation time of the photoconductor.

12. The image forming apparatus according to claim 1, wherein the image forming unit includes an intermediate transfer member to which the image is transferred, and the information includes information related to a rotation time of the intermediate transfer member.

13. The image forming apparatus according to claim 1, wherein the controller executes the first calibration whenever images, which are to be transferred to a first number of sheets, are formed by the image forming unit, and the controller executes the second calibration whenever images, which are to be transferred to a second number of sheets that is less than the first number of sheets, are formed by the image forming unit.

14. The image forming apparatus according to claim 1, wherein the controller controls whether or not to form the second pattern image based on the image data.

15. The image forming apparatus according to claim 14, wherein the controller controls whether or not to form the second pattern image based on the amount of toner consumed in the image formed based on the image data.

16. The image forming apparatus according to claim 1, wherein the controller executes the second calibration a plurality of times from when the first calibration is executed until when the first calibration is executed again.

17. The image forming apparatus according to claim 1, wherein the image forming unit includes an intermediate transfer member to which the image is transferred, and the sensor detects the pattern image on the intermediate transfer member.

18. The image forming apparatus according to claim 1, wherein the image forming unit includes:

a photoconductor;

a light source configured to expose the photoconductor to form an electrostatic latent image; and a developing sleeve configured to develop the electrostatic latent image on the photoconductor using a toner, wherein the sensor detects the pattern image on the photoconductor.

19. The image forming apparatus according to claim 1, wherein the sensor detects the pattern image on a sheet.

* * * * *